United States Patent
Fuchs

(10) Patent No.: US 11,403,280 B2
(45) Date of Patent: Aug. 2, 2022

(54) MASTER DATA MANAGEMENT TECHNOLOGIES

(71) Applicant: salesforce.com, inc., San Francisco, CA (US)

(72) Inventor: Matthew D. Fuchs, Los Gatos, CA (US)

(73) Assignee: SALESFORCE.COM, INC., San Francisco, CA (US)

(*) Notice: Subject to any disclaimer, the term of this patent is extended or adjusted under 35 U.S.C. 154(b) by 128 days.

(21) Appl. No.: 16/582,662

(22) Filed: Sep. 25, 2019

(65) Prior Publication Data

US 2021/0089512 A1 Mar. 25, 2021

(51) Int. Cl.
| | |
|---|---|
| *G06F 16/23* | (2019.01) |
| *G06F 16/2455* | (2019.01) |
| *G06F 16/2458* | (2019.01) |
| *G06F 16/27* | (2019.01) |
| *G06F 16/28* | (2019.01) |

(52) U.S. Cl.
CPC ...... *G06F 16/2365* (2019.01); *G06F 16/2358* (2019.01); *G06F 16/2471* (2019.01); *G06F 16/24565* (2019.01); *G06F 16/24568* (2019.01); *G06F 16/275* (2019.01); *G06F 16/285* (2019.01)

(58) Field of Classification Search
CPC .......... G06F 16/2365; G06F 16/24568; G06F 16/24565; G06F 16/2471; G06F 16/285; G06F 16/275; G06F 16/2358
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz et al. |
| 5,649,104 A | 7/1997 | Carleton et al. |
| 5,715,450 A | 2/1998 | Ambrose et al. |
| 5,761,419 A | 6/1998 | Schwartz et al. |

(Continued)

OTHER PUBLICATIONS

Zhang, Yifei. Designing a supplier database to support sourcing analysis. MS thesis. 2013. (Year: 2013).*

(Continued)

*Primary Examiner* — Mohsen Almani
(74) *Attorney, Agent, or Firm* — Schwabe Williamson & Wyatt

(57) ABSTRACT

Disclosed embodiments are related to Master Data Management (MDM) technologies. Each DB entity (record) in component databases (DB) is represented as a judgment, and an MDM system unifies judgments obtained from the component DBs into a unified set of judgments. In the unified set of judgments, linkages are judgments asserting that particular DB entities from different DBs are the same/similar, and a golden record comprises field values describing each of the DB entities. In making judgments, the MDM system consolidates judgments (or records) describing the same subject into a single judgment, and performs updates to field values in a manner that does not violate referential integrity. Each update is associated with an MDM consistent state. Updates in the form of judgments are provided to the relevant component DBs, which are converted into serializable transactions associated with respective MDM consistent states. Other embodiments may be described and/or claimed.

20 Claims, 6 Drawing Sheets

(56) References Cited

U.S. PATENT DOCUMENTS

| | | |
|---|---|---|
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 5,983,227 A | 11/1999 | Nazem et al. |
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,133 B1 | 4/2001 | Masthoff |
| 6,216,135 B1 | 4/2001 | Brodersen et al. |
| 6,233,617 B1 | 5/2001 | Rothwein et al. |
| 6,236,978 B1 | 5/2001 | Tuzhilin |
| 6,266,669 B1 | 7/2001 | Brodersen et al. |
| 6,288,717 B1 | 9/2001 | Dunkle |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,411,949 B1 | 6/2002 | Schaffer |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec et al. |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 6,907,566 B1 | 6/2005 | McElfresh et al. |
| 7,062,502 B1 | 6/2006 | Kesler |
| 7,069,231 B1 | 6/2006 | Cinarkaya |
| 7,069,497 B1 | 6/2006 | Desai |
| 7,100,111 B2 | 8/2006 | McElfresh et al. |
| 7,181,758 B1 | 2/2007 | Chan |
| 7,269,590 B2 | 9/2007 | Hull et al. |
| 7,289,976 B2 | 10/2007 | Kihneman et al. |
| 7,340,411 B2 | 3/2008 | Cook |
| 7,356,482 B2 | 4/2008 | Frankland et al. |
| 7,373,599 B2 | 5/2008 | McElfresh et al. |
| 7,401,094 B1 | 7/2008 | Kesler |
| 7,406,501 B2 | 7/2008 | Szeto et al. |
| 7,412,455 B2 | 8/2008 | Dillon |
| 7,454,509 B2 | 11/2008 | Boulter et al. |
| 7,508,789 B2 | 3/2009 | Chan |
| 7,599,935 B2 | 10/2009 | La Rotonda et al. |
| 7,603,331 B2 | 10/2009 | Tuzhilin et al. |
| 7,603,483 B2 | 10/2009 | Psounis et al. |
| 7,613,740 B2 * | 11/2009 | Holenstein ............ G06F 16/275 707/615 |
| 7,620,655 B2 | 11/2009 | Larsson et al. |
| 7,644,122 B2 | 1/2010 | Weyer et al. |
| 7,668,861 B2 | 2/2010 | Steven |
| 7,698,160 B2 | 4/2010 | Beaven et al. |
| 7,730,478 B2 | 6/2010 | Weissman |
| 7,747,648 B1 | 6/2010 | Kraft et al. |
| 7,779,039 B2 | 8/2010 | Weissman et al. |
| 7,779,475 B2 | 8/2010 | Jakobson et al. |
| 7,827,208 B2 | 11/2010 | Bosworth et al. |
| 7,853,881 B1 | 12/2010 | Aly Assal et al. |
| 7,945,653 B2 | 5/2011 | Zukerberg et al. |
| 8,005,896 B2 | 8/2011 | Cheah |
| 8,014,943 B2 | 9/2011 | Jakobson |
| 8,015,495 B2 | 9/2011 | Achacoso et al. |
| 8,032,297 B2 | 10/2011 | Jakobson |
| 8,073,850 B1 | 12/2011 | Hubbard et al. |
| 8,082,301 B2 | 12/2011 | Ahlgren et al. |
| 8,095,413 B1 | 1/2012 | Beaven |
| 8,095,531 B2 | 1/2012 | Weissman et al. |
| 8,095,594 B2 | 1/2012 | Beaven et al. |
| 8,103,611 B2 | 1/2012 | Tuzhilin et al. |
| 8,150,913 B2 | 4/2012 | Cheah |
| 8,209,308 B2 | 6/2012 | Rueben et al. |
| 8,209,333 B2 | 6/2012 | Hubbard et al. |
| 8,275,836 B2 | 9/2012 | Beaven et al. |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,566,301 B2 | 10/2013 | Rueben et al. |
| 8,620,901 B2 | 12/2013 | Jagota et al. |
| 8,646,103 B2 | 2/2014 | Jakobson et al. |
| 8,812,411 B2 * | 8/2014 | Malka ...................... G06N 5/04 706/12 |
| 9,349,101 B2 | 5/2016 | Fuchs et al. |
| 9,424,336 B2 | 8/2016 | Fuchs et al. |
| 9,594,790 B2 | 3/2017 | Fuchs et al. |
| 9,619,458 B2 | 4/2017 | Fuchs et al. |
| 9,659,059 B2 | 5/2017 | Fuchs |
| 9,659,303 B2 | 5/2017 | Orun et al. |
| 9,734,187 B2 | 8/2017 | Fuchs |
| 9,977,797 B2 | 5/2018 | Jagota et al. |
| 10,146,955 B2 | 12/2018 | Fuchs |
| 10,163,056 B2 | 12/2018 | Fuchs et al. |
| 10,204,120 B2 | 2/2019 | Fuchs |
| 10,423,883 B2 | 9/2019 | Fuchs |
| 10,467,292 B2 | 11/2019 | Fuchs |
| 10,515,082 B2 | 12/2019 | Fuchs |
| 10,558,634 B2 | 2/2020 | Fuchs |
| 10,592,955 B2 | 3/2020 | Jagota et al. |
| 10,747,571 B2 | 8/2020 | Fuchs |
| 10,902,004 B2 | 1/2021 | Fuchs |
| 11,275,727 B2 * | 3/2022 | Oberhofer ............... G06F 13/20 |
| 2001/0044791 A1 | 11/2001 | Richter et al. |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165724 A1 * | 11/2002 | Blankesteijn ....... G06F 16/2308 705/1.1 |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |

(56) References Cited

U.S. PATENT DOCUMENTS

| | | |
|---|---|---|
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2006/0200501 A1* | 9/2006 | Holenstein ............ G06F 16/275 |
| 2006/0294151 A1* | 12/2006 | Wong ..................... G06F 16/25 |
| 2008/0249972 A1 | 10/2008 | Dillon |
| 2009/0063415 A1 | 3/2009 | Chatfield et al. |
| 2009/0100342 A1 | 4/2009 | Jakobson |
| 2009/0177744 A1 | 7/2009 | Marlow et al. |
| 2011/0218958 A1 | 9/2011 | Warshavsky |
| 2011/0247051 A1 | 10/2011 | Bulumulla |
| 2012/0042218 A1 | 2/2012 | Cinarkaya |
| 2012/0233137 A1 | 9/2012 | Jakobson et al. |
| 2012/0290407 A1 | 11/2012 | Hubbard et al. |
| 2013/0212497 A1 | 8/2013 | Zelenko et al. |
| 2013/0218948 A1 | 8/2013 | Jakobson |
| 2013/0218949 A1 | 8/2013 | Jakobson |
| 2013/0218966 A1 | 8/2013 | Jakobson |
| 2013/0247216 A1 | 9/2013 | Cinarkaya |
| 2014/0025683 A1 | 1/2014 | Howland et al. |
| 2014/0304279 A1 | 10/2014 | Fuchs et al. |
| 2014/0359537 A1 | 12/2014 | Jackobson et al. |
| 2015/0347926 A1 | 12/2015 | Fuchs |
| 2016/0125347 A1 | 5/2016 | Jagota et al. |
| 2016/0125442 A1 | 5/2016 | Jagota et al. |
| 2016/0140355 A1 | 5/2016 | Jagota et al. |
| 2018/0081988 A1 | 3/2018 | Fuchs |
| 2018/0150504 A1* | 5/2018 | Lee ......................... G06F 16/27 |
| 2018/0349418 A1* | 12/2018 | Lee ....................... G06F 16/219 |
| 2019/0272478 A1 | 9/2019 | Fuchs |
| 2021/0125083 A1* | 4/2021 | Ogawa ................... G06N 20/00 |

OTHER PUBLICATIONS

Dahlberg, Tomi, Altti Lagstedt, and Tiina Nokkala. "How to address master data complexity in in-formation systems development—A federative approach." (2018). (Year: 2018).*

Bridge, James P., Machine Learning and Automated Theorem Providing, University of Cambridge Computer Laboratory, Technical Report, No. 972, Nov. 2010, pp. 1-180.

SAS Institute Inc. World Headquarters, Challenges in the Effective Use of Master Data Management Techniques, White Paper, 2013, pp. 1-11.

Loshin, David, How Deterministic and Probabilistic Matching Work, https://searchdatamanagement.techtarget.com/tip/How-deterministic-and-probabilistic-matching-work, Oct. 31, 2018, pp. 1-5.

Loshin, David, How to Build a Master Data Index: Static vs. Dynamic Indexing, https://searchdatamanagement.techtarget.com/tip/How-to-build-a-master-data-index-Static-vs-dynamic-indexing?vgnextfmt=print, Oct. 31, 2018, pp. 1-2.

SearchDataManagement.com, Introduction to Enterprise Master Data Management, https://searchdatamanagement.techtarget.com/feature/Introduction-to-enterprise-master-data-management?vgnextfmt32 print, Jul. 10, 2008, pp. 1-47.

Angiuli et al., "Meaning explanations at higher dimension", Indagationes Mathematicae, vol. 29, No. 1, pp. 135-149 (Feb. 1, 2018).

Eades, "Type Theory and Applications" (2016), available at: https://metatheorem.org/includes/pubs/comp.pdf.

Aleksey, "Judgments in formal systems", everything2.org (Jul. 6, 2003), available at: https://www.everything2.org/?node=judgment.

Harper, "Practical Foundations for Programming Languages", Cambridge University Press, Cambridge, England, 2ed, preview (Apr. 4, 2016), available at: https://www.cs.cmu.edu/~rwh/pfpl/2nded.pdf.

Martin-Löf, "On the meaning of the logical constants and the justifications of the logical laws", Nordic J. of Philosophical Logic, Scandinavian Univ. Press, vol. 1, No. 1, pp. 11-60 (1996).

"Judgment", N Lab (accessed on Jan. 25, 2022), available at: https://nlab-pages.s3.us-east-2.amazonaws.com/nlab/show/judgment.

"Type theory", N Lab (accessed on Jan. 25, 2022), available at: https://nlab-pages.s3.us-east-2.amazonaws.com/nlab/show/type+theory.

Nordström et al., "Programming in Martin-Löf's Type Theory: an Introduction", Oxford Univ. Press (1990), available at https://www.cse.chalmers.se/research/group/logic/book/book.pdf.

Martin-Löf, "Truth of a proposition, evidence of a judgment, validity of a proof", Synthese, vol. 73, pp. 407-420 (Dec. 1, 1987), available at: http://archive-pml.github.io/martin-lof/pdfs/Truth-of-a-Proposition-Evidence-of-a-Judgment-1987.pdf.

Pfenning et al, "A Judgmental Reconstruction of Modal Logic", Department of Computer Science, Carnegie Mellon University, pp. 1-31 (May 2000).

Sterling, "Type theory and its meaning explanations", Chapters 1-4, pp. 1-28 (Jul. 14, 2016).

* cited by examiner

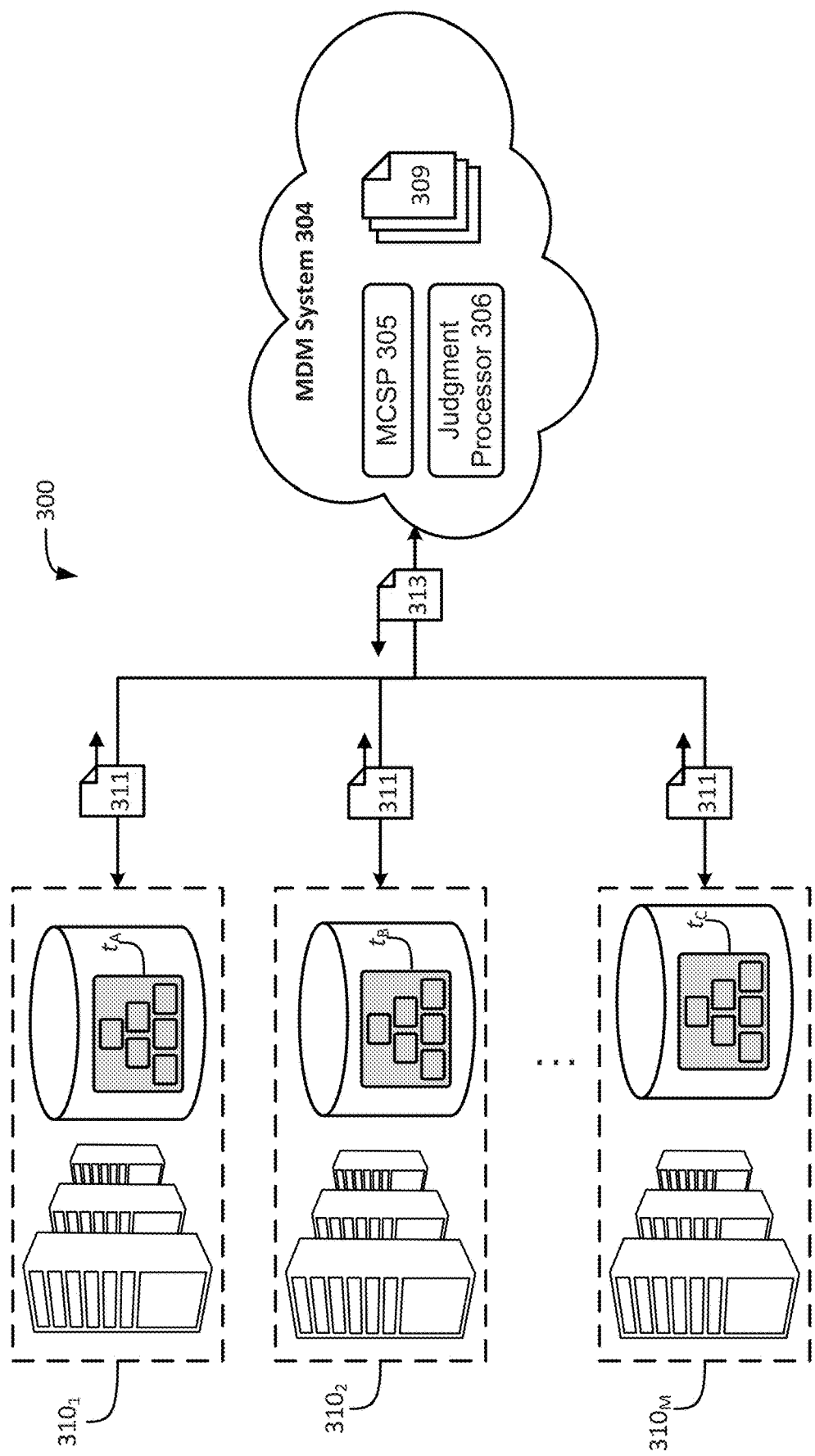

MASTER DATA MANAGEMENT TECHNOLOGIES

COPYRIGHT NOTICE

A portion of the disclosure of this patent document contains material which is subject to copyright protection. The copyright owner has no objection to the facsimile reproduction by anyone of the patent document or the patent disclosure, as it appears in the United States Patent and Trademark Office patent file or records, but otherwise reserves all copyright rights whatsoever.

TECHNICAL FIELD

One or more implementations relate generally to database systems, and in particular to data management and data integration technologies.

BACKGROUND

Master data management (MDM) involves systems and methods used to enable an enterprise or organization (org) to manage critical data assets across diverse systems and datastores, which often includes linking all or most critical data to a common point of reference or file, which is often referred to as a "master file" or "golden record." When properly done, MDM improves data quality, while streamlining data sharing across personnel and departments. MDM also facilitates computing in multiple systems, architectures, platforms, applications, etc.

Conventional MDM solutions tend to be extremely obtrusive because they require centralization of the disparate DBs to a central master DB. In these conventional MDM solutions, updates are performed on the master DB before being shared with the disparate DBs. These conventional MDM solutions usually have slow responsiveness, have high resource overhead, and are susceptible to bottlenecks and/or overload scenarios. Less obtrusive MDM solutions allow the disparate DBs to maintain local versions of the data and attempt to synchronize each DB. However, synchronization of multiple disparate DBs can be computationally complex. Other conventional MDM solutions use change data capture (CDC) techniques to capture changes occurring in various databases and then moving that data around as needed. However, it is difficult to create golden records using CDC-based MDM solutions.

BRIEF DESCRIPTION OF THE DRAWINGS

The included drawings are for illustrative purposes and serve to provide examples of possible structures and operations for the disclosed inventive systems, apparatus, methods and computer-readable storage media. These drawings in no way limit any changes in form and detail that may be made by one skilled in the art without departing from the spirit and scope of the disclosed implementations.

FIG. 3 illustrates an example Master Data Management (MDM) environment according to various embodiments.

DETAILED DESCRIPTION

Figure 1A:
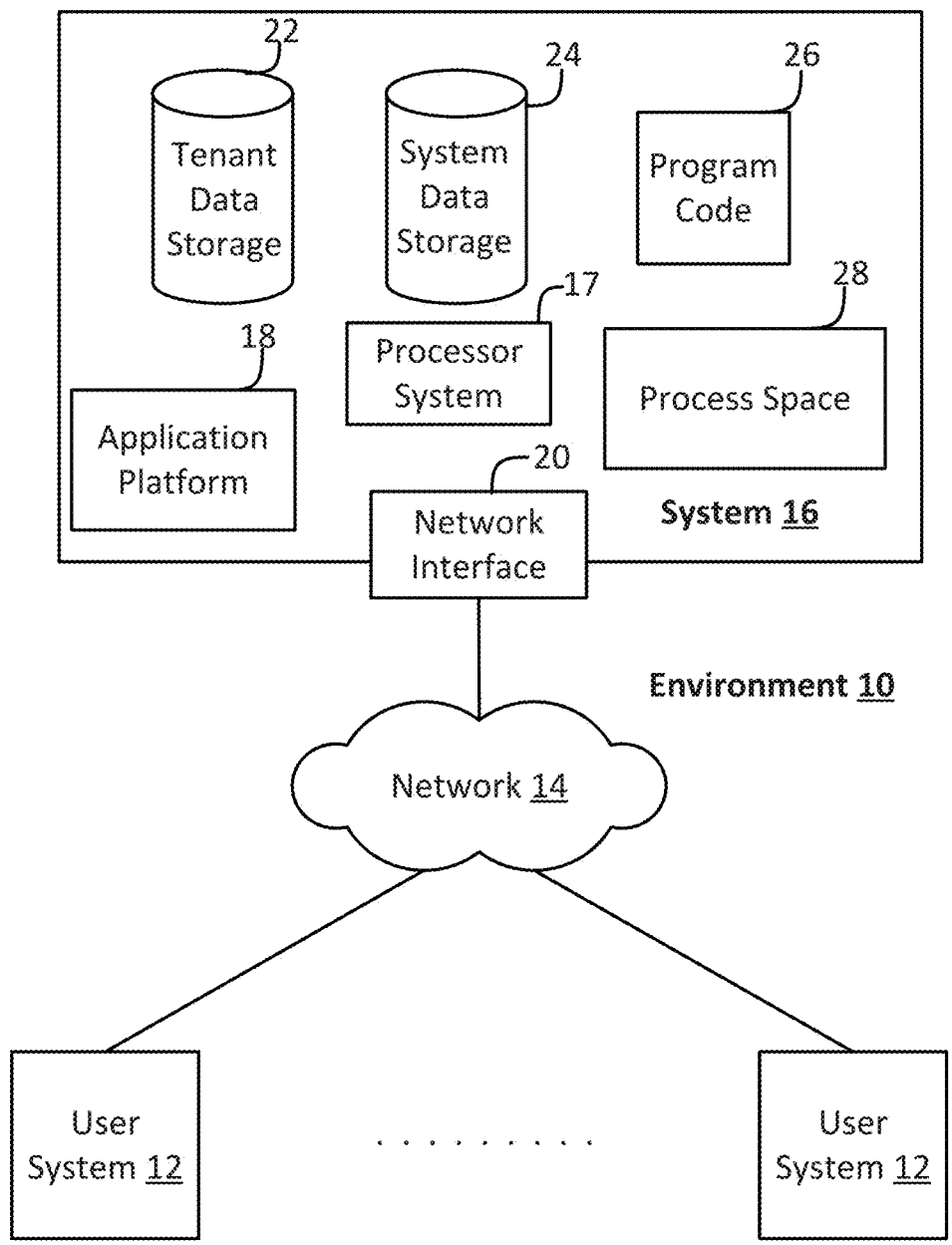
FIG. 1A shows an example environment in which an on-demand database service can be used according to various embodiments.

Disclosed embodiments are related to master data management (MDM) systems. MDM seeks to ensure that an enterprise or organization does not use multiple, potentially inconsistent, versions of the same data in different parts of its operations. MDM includes processes to ensure that reference data is kept up-to-date and coordinated across the enterprise. Many MDM systems attempt to create a "golden record," which is a single well-defined version of all the data entities (records) in the enterprise's databases (DBs). The golden record encompasses all the data in every system of record (SoR) within a particular organization. Many MDM systems also attempt to provide a set of "linkages," which involves identifying records across the enterprise's DBs that are related to the same entity (e.g., individual customers of the enterprise), and identifying individual elements (e.g., user systems or platforms) that tend to update records pertaining to the same entity.

The present disclosure introduces two concepts including a first concept of representing MDM records as a set of judgments and a second concept of "MDM consistent states." In various embodiments, an MDM system (also referred to as a "master MDM element") manages DB entities (records) across multiple component DBs. Each component DB comprises a set of tables where each table is a set of records, and each record is a tuple of fields including an index field. The component DBs indicate updates to their local versions of the tables in the form of judgments. In various embodiments, a Change Data Capture (CDC) mechanism or other like event streaming technology may be used to communicate indications of the updates from the component DBs to the MDM system. The MDM system unifies the judgments received from the component DBs with a set of judgments maintained by the MDM system. This unified set of judgments is a golden record, where records that are the same (or have the same field values) are identified as linkages.

When the MDM system discovers records in the one or more component DBs that describe the same subject or the like, the master MDM element may consolidate those records into a single record. In order to consolidate these records in a manner that does not violate referential integrity (lost records), the MDM system may regulate the component DBs to execute local transactions in "MDM consistent states." The MDM consistent state is a state in which all records in each DB managed by the master MDM element have the latest, most up-to-date data. When a component DB requests to add a record or update the values of one or more fields in one or more records (corresponding to distributed sets of records). The master MDM element evaluates the proposed changes, updates shared data where necessary, and arrives at another MDM consistent state. Afterwards, the master MDM element informs each component DB of the records that need to be updated to be consistent with the new MDM consistent state. Each component DB updates its own local version of the indicated records/fields. Each component DB is in the MDM consistent state until it processes an update to one or more records. Processing the update causes a component DB to transition from the MDM consistent state to the new MDM consistent state. Other embodiments may be described and/or disclosed.

Examples of systems, apparatus, computer-readable storage media, and methods according to the disclosed implementations are described in this section. These examples are being provided solely to add context and aid in the understanding of the disclosed implementations. It will thus be apparent to one skilled in the art that the disclosed implementations may be practiced without some or all of the specific details provided. In other instances, certain process or method operations, also referred to herein as "blocks," have not been described in detail in order to avoid unnecessarily obscuring of the disclosed implementations. Other implementations and applications are also possible, and as such, the following examples should not be taken as definitive or limiting either in scope or setting.

In the following detailed description, references are made to the accompanying drawings, which form a part of the description and in which are shown, by way of illustration, specific implementations. Although these disclosed implementations are described in sufficient detail to enable one skilled in the art to practice the implementations, it is to be understood that these examples are not limiting, such that other implementations may be used and changes may be made to the disclosed implementations without departing from their spirit and scope. For example, the blocks of the methods shown and described herein are not necessarily performed in the order indicated in some other implementations. Additionally, in some other implementations, the disclosed methods includes more or fewer blocks than are described. As another example, some blocks described herein as separate blocks may be combined in some other implementations. Conversely, what may be described herein as a single block may be implemented in multiple blocks in some other implementations. Additionally, the conjunction "or" is intended herein in the inclusive sense where appropriate unless otherwise indicated; that is, the phrase "A, B or C" is intended to include the possibilities of "A," "B," "C," "A and B," "B and C," "A and C" and "A, B and C."

Example embodiments of the present disclosure may be described in terms of a multitenant and/or cloud computing architecture or platform. Cloud computing refers to a paradigm for enabling network access to a scalable and elastic pool of shareable computing resources with self-service provisioning and administration on-demand and without active management by users. Computing resources (or simply "resources") are any physical or virtual component, or usage of such components, of limited availability within a computer system or network. Examples of resources include usage/access to, for a period of time, servers, processor(s), storage equipment, memory devices, memory areas, networks, electrical power, input/output (peripheral) devices, mechanical devices, network connections (e.g., channels/links, ports, network sockets, etc.), operating systems, virtual machines (VMs), software/applications, computer files, and/or the like. Cloud computing provides cloud computing services (or cloud services), which are one or more capabilities offered via cloud computing that are invoked using a defined interface (e.g., an API or the like). Multi-tenancy is a feature of cloud computing where physical or virtual resources are allocated in such a way that multiple tenants and their computations and data are isolated from and inaccessible to one another. As used herein, the term "tenant" refers to a group of users (e.g., cloud service users) who share common access with specific privileges to a software instance and/or a set of computing resources. Tenants may be individuals, organizations, or enterprises that are customers or users of a cloud computing service or platform. However, a given cloud service customer organization could have many different tenancies with a single cloud service provider representing different groups within the organization. A multi-tenant platform or architecture, such as those discussed herein, may provide a tenant with a dedicated share of a software instance typically including one or more of tenant specific data, user management, tenant-specific functionality, configuration, customizations, non-functional properties, associated applications, etc. Multi-tenancy contrasts with multi-instance architectures, where separate software instances operate on behalf of different tenants.

In some implementations, the users described herein are users (or "members") of an interactive online "enterprise social network," also referred to herein as an "enterprise social networking system," an "enterprise collaborative network," or more simply as an "enterprise network." Such online enterprise networks are increasingly becoming a common way to facilitate communication among people, any of whom can be recognized as enterprise users. One example of an online enterprise social network is Chatter®, provided by salesforce.com, Inc. of San Francisco, Calif. salesforce.com, Inc. is a provider of enterprise social networking services, customer relationship management (CRM) services and other database management services, any of which can be accessed and used in conjunction with the techniques disclosed herein in some implementations. These various services can be provided in a cloud computing environment as described herein, for example, in the context of a multi-tenant database system. Some of the described techniques or processes can be implemented without having to install software locally, that is, on computing devices of users interacting with services available through the cloud. While the disclosed implementations may be described with reference to Chatter® and more generally to enterprise social networking, those of ordinary skill in the art should understand that the disclosed techniques are neither limited to Chatter® nor to any other services and systems provided by salesforce.com, Inc. and can be implemented in the context of various other database systems such as cloud-based systems that are not part of a multi-tenant database system or which do not provide enterprise social networking services.

I. Example System Overview

FIG. 1A shows an example of an environment 10 in which on-demand services (e.g., cloud computing services and/or database services) can be used in accordance with various embodiments. The environment 10 includes user systems 12, a network 14, and system 16 (also referred to herein as a "cloud-based system," "database system," "cloud computing service," or the like). The cloud system 16 includes a processor system 17, an application platform 18, a network interface 20, tenant database (DB) 22 for storing tenant data 23 (see FIG. 1B), system DB 24 for storing system data 25 (see FIG. 1B), program code 26 for implementing various functions of the system 16, and process space 28 for executing DB system processes and tenant-specific processes, such as running applications as part of an application hosting service. In some other implementations, environment 10 may not have all of these components or systems, or may have other components or systems instead of, or in addition to, those listed above.

Figure 1B:
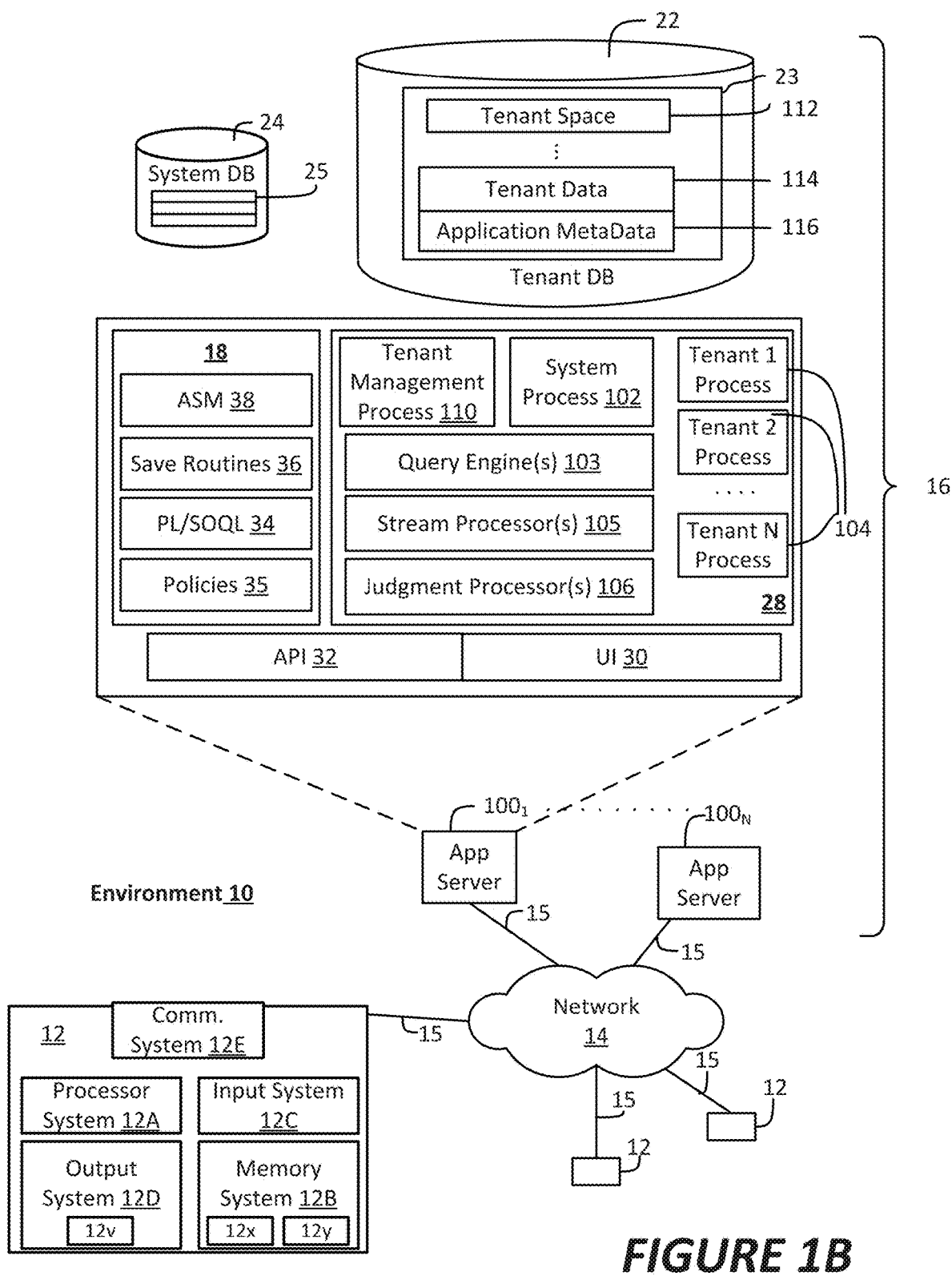
FIG. 1B shows an example implementation of elements of FIG. 1A and example interconnections between these elements according to various embodiments.

The system 16 may be a DB system and/or a cloud computing service comprising a network or other interconnection of computing systems (e.g., servers, storage devices, applications, etc., such as those discussed with regard to FIGS. 1A-1B infra) that provides access to a pool of physical and/or virtual resources. In some implementations, the system 16 is a multi-tenant DB system and/or a multi-tenant cloud computing platform. In some implementations, the system 16 provides a Communications as a Service (CaaS), Compute as a Service (CompaaS), Database as a Service (DaaS), Data Storage as a Service (DSaaS), Firewall as a Service (FaaS), Infrastructure as a Service (IaaS), Network as a Service (NaaS), Platform as a Service (PaaS), Security as a Service, Software as a Service (SaaS), and/or other like cloud services.

In some implementations, the environment 10 is an environment in which an on-demand DB service exists. An on-demand DB service, such as that which can be implemented using the system 16, is a service that is made available to users outside of the enterprise(s) that own, maintain or provide access to the system 16. As described above, such users generally do not need to be concerned with building or maintaining the system 16. Instead, resources provided by the system 16 may be available for such users' use when the users need services provided by the system 16; that is, on the demand of the users. Some on-demand DB services can store information from one or more tenants into tables of a common DB image to form a multi-tenant DB system (MTS). The term "multi-tenant DB system" can refer to those systems in which various elements of hardware and software of a DB system may be shared by one or more customers or tenants. For example, a given application server may simultaneously process requests for a great number of customers, and a given DB table may store rows of data such as feed items for a potentially much greater number of customers. A DB image can include one or more DB objects. A relational DB management system (RDBMS) or the equivalent can execute storage and retrieval of information against the DB object(s).

Application platform 18 can be a framework that allows the applications of system 16 to execute, such as the hardware or software infrastructure of the system 16. In some implementations, the application platform 18 enables the creation, management and execution of one or more applications developed by the provider of the on-demand DB service, users accessing the on-demand DB service via user systems 12, or third party application developers accessing the on-demand DB service via user systems 12.

In some implementations, the system 16 implements a web-based customer relationship management (CRM) system. For example, in some such implementations, the system 16 includes application servers configured to implement and execute CRM software applications as well as provide related data, code, forms, renderable web pages and documents and other information to and from user systems 12 and to store to, and retrieve from, a DB system related data, objects, and web page content. In some MTS implementations, data for multiple tenants may be stored in the same physical DB object in tenant DB 22. In some such implementations, tenant data is arranged in the storage medium(s) of tenant DB 22 so that data of one tenant is kept logically separate from that of other tenants so that one tenant does not have access to another tenant's data, unless such data is expressly shared. The system 16 also implements applications other than, or in addition to, a CRM application. For example, the system 16 can provide tenant access to multiple hosted (standard and custom) applications, including a CRM application. User (or third party developer) applications, which may or may not include CRM, may be supported by the application platform 18. The application platform 18 manages the creation and storage of the applications into one or more DB objects and the execution of the applications in one or more virtual machines in the process space of the system 16. The applications of the application platform 18 may be developed with any suitable programming languages and/or development tools, such as those discussed herein. The applications may be built using a platform-specific and/or proprietary development tool and/or programming languages, such as those discussed herein.

In embodiments, the tenant data storage 22, the system data storage 24, and/or some other data store (not shown) include Extract-Load-Transform (ELT) data or Extract-Transform-Load (ETL) data, which may be raw data extracted from various sources and normalized (e.g., indexed, partitioned, augmented, canonicalized, etc.) for analysis and other transformations. In some embodiments, the raw data may be loaded into the tenant data storage 22, the system data storage 24, and/or some other data store (not shown) and stored as key-value pairs, which may allow the data to be stored in a mostly native form without requiring substantial normalization or formatting.

According to some implementations, each system 16 is configured to provide web pages, forms, applications, data and media content to user (client) systems 12 to support the access by user systems 12 as tenants of system 16. As such, system 16 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically or physically connected servers distributed locally or across one or more geographic locations. Additionally, the term "server" is meant to refer to a computing device or system, including processing hardware and process space(s), an associated storage medium such as a memory device or DB, and, in some instances, a DB application (e.g., OODBMS or RDBMS) as is well known in the art. It should also be understood that "server system" and "server" are often used interchangeably herein. Similarly, the DB objects (DBOs) described herein can be implemented as part of a single DB, a distributed DB, a collection of distributed DBs, a DB with redundant online or offline backups or other redundancies, etc., and can include a distributed DB or storage network and associated processing intelligence.

The network 14 can be or include any network or combination of networks of systems or devices that communicate with one another. For example, the network 14 can be or include any one or any combination of a local area network (LAN), a wireless LAN (WLAN), wide area network (WAN), telephone network, wireless network, cellular network, point-to-point network, star network, token ring network, hub network, or other appropriate configuration including proprietary and/or enterprise networks, or combinations thereof. The network 14 can include a Transfer Control Protocol and Internet Protocol (TCP/IP) network, such as the global internetwork of networks often referred to as the "Internet" (with a capital "I"). The Internet will be used in many of the examples herein. However, it should be understood that the networks that the disclosed implementations can use are not so limited, although TCP/IP is a frequently implemented protocol. The network 14 may comprise one or more network elements, each of which may include one or more processors, communications systems (e.g., including network interface controllers, one or more transmitters/receivers connected to one or more antennas, etc.), and computer readable media. Examples of such network elements may include wireless APs (WAPs), a home/business server (with or without radio frequency (RF) communications circuitry), routers, switches, hubs, radio beacons, (macro or small-cell) base stations, servers (e.g., stand-alone, rack-mounted, blade, etc.), and/or any other like devices/systems. Connection to the network 14 may be via a wired or a wireless connection using one or more of the various communication protocols discussed infra. As used herein, a wired or wireless communication protocol may refer to a set of standardized rules or instructions implemented by a communication device/system to communicate with other devices, including instructions for packetizing/depacketizing data, modulating/demodulating signals, implementation of protocols stacks, and the like. Connection to the network 14 may require that the various devices and network elements execute software routines which enable, for example, the seven layers of the open systems interconnection (OSI) model of computer networking or equivalent in a wireless network.

The user systems 12 can communicate with system 16 using TCP/IP and, at a higher network level, other common Internet protocols to communicate, such as Hypertext Transfer Protocol (HTTP), File Transfer Protocol (FTP), Andrew File System (AFS), Wireless Application Protocol (WAP), Internet Protocol (IP), Internet Protocol Security (IPsec), Session Initiation Protocol (SIP) with Real-Time Transport Protocol (RTP or Secure RTP (SRTP), Internet Control Message Protocol (ICMP), User Datagram Protocol (UDP), QUIC (sometimes referred to as "Quick UDP Internet Connections"), Stream Control Transmission Protocol (SCTP), Web-based secure shell (SSH), Extensible Messaging and Presence Protocol (XMPP), WebSocket protocol, Internet Group Management Protocol (IGMP), Internet Control Message Protocol (ICMP), etc. In an example where HTTP is used, each user system 12 can include an HTTP client commonly referred to as a "web browser" or simply a "browser" for sending and receiving HTTP signals to and from an HTTP server (also referred to as a "web server") of the system 16. In this example, each user system 12 may send and receive HTTP messages where a header of each message includes various operating parameters and the body of the such messages may include code or source code documents (e.g., HTML, XML, JSON, Apex®, CSS, JSP, MessagePack™, Apache® Thrift™, ASN.1, Google® Protocol Buffers (protobuf), DBOs, or some other like object(s)/document(s)). Such an HTTP server can be implemented as the sole network interface 20 between the system 16 and the network 14, but other techniques can be used in addition to or instead of these techniques. In some implementations, the network interface 20 between the system 16 and the network 14 includes load sharing functionality, such as round-robin HTTP request distributors to balance loads and distribute incoming HTTP requests evenly over a number of servers. In MTS implementations, each of the servers can have access to the MTS data; however, other alternative configurations may be used instead.

The user systems 12 can be implemented as any computing device(s) or other data processing apparatus or systems usable by users to access the DB system 16. For example, any of user systems 12 can be a desktop computer, a work station, a laptop computer, a tablet computer, a handheld computing device (e.g., Personal Data Assistants (PDAs), pagers, portable media player, etc.), a mobile cellular phone (e.g., a "smartphone"), or any other WiFi-enabled device, WAP-enabled device, or other computing device capable of interfacing directly or indirectly to the Internet or other network (e.g., network 14). The terms "user system", "computing device", "computer system", or the like may be used interchangeably herein with one another and with the term "computer."

As described above, each user system 12 typically executes an HTTP client, for example, a web browsing (or simply "browsing") program, such as a web browser based on the WebKit platform, Microsoft's Internet Explorer browser, Apple's Safari, Google's Chrome, Opera's browser, or Mozilla's Firefox browser, and/or the like, to execute and render web applications allowing a user (e.g., a subscriber of on-demand services provided by the system 16) of the user system 12 to access, process and view information, pages, interfaces (e.g., UI 30 in FIG. 1B), and applications (e.g., application(s) 12y in FIG. 1B) available to it from the system 16 over the network 14. In other implementations, each user system 12 may operate a web or user application (e.g., application 12y in FIG. 1B) designed to interact with applications of the application platform 18 allowing a user (e.g., a subscriber of on-demand services provided by the system 16) of the user system 12 to access, process and view information, pages, interfaces (e.g., UI 30 in FIG. 1B), and applications available to it from the system 16 over the network 14. In some cases, an owner/operator of DB system 16 may have pre-built the web or user applications for use by clients, customers, and/or agents of a tenant organization (org) to access a tenant space or enterprise social network of that tenant org. In some cases, developers associated with a tenant org may build custom application(s) for interacting with the tenant data. The user (or third party) application(s) may be native application(s) (e.g., executed and rendered in an application container) or hybrid application(s) (e.g., web applications being executed/rendered in an application container or skeleton). The user (or third party) application(s) may be platform-specific, or developed to operate on a particular type of user system 12 or a particular (hardware and/or software) configuration of a user system 12. The term "platform-specific" may refer to the platform implemented by the user system 12, the platform implemented by the DB system 16, and/or a platform of a third party system/platform. The web, user, or third party application(s) 12y discussed herein may be a software, program code, logic modules, application packages, etc. that are built using one or more programming languages and/or development tools, such as those discussed herein. Furthermore, such applications may utilize a suitable querying language to query and store information in an associated tenant space, such as, for example, the various query languages discussed herein or the like.

In an example, the user systems 12 may implement web, user, or third party applications 12y to request and obtain data from DB system 16, and render graphical user interfaces (GUIs) in an application container or browser. These GUIs may correspond with GUI 12v and/or UI 30 shown and described with respect to FIG. 1B. In some implementations, the GUIs may include a data analytics GUI, such as Salesforce® Wave™ dashboard, which may provide visual representations of data (also referred to as visual representations 12v or the like) residing in an enterprise cloud or in an on-demand services environment (e.g., a tenant space within DB system 16). The GUIs may include one or more components (e.g., graphical control elements (GCEs), tabs, reports, dashboards, widgets, pages, etc.). Examples of such components may include audio/video calling components, messaging components (e.g., chat, instant messaging, short message service (SMS)/multimedia messaging service (MMS) messaging, emailing, etc.), and visualization components. The visualization components may enable a user of a user system 12 to select visualization parameters (also referred to as "lens parameters" or "filters") for displaying data from one or more datasets. A dataset may be a specific view or transformation of data from one or more data sources (e.g., a tenant space of DB 22, etc.). The visualization parameters may include, for example, a selection of data or data type to display from one or more datasets; a particular graph, chart, or map in which to view the selected data; color schemes for the graphs/charts/maps; a position or orientation of the graphs/charts/maps within a particular GUI, etc. The graphs/charts/maps to be displayed may be referred to as a "lens" or a "dashboard". A lens may be a particular view of data from one or more datasets, and a dashboard may be a collection of lenses. In some implementations, a GUI may display lenses, dashboards, and/or control panels to alter or rearrange the lenses/dashboards. Furthermore, the various application(s) discussed herein may also enable the user system 12 to provide authentication credentials (e.g., user identifier (user_id), password, personal identification number (PIN), digital certificates, etc.) to the DB system 16 so that the DB system 16 may authenticate the identity of a user of the user system 12.

Each user system 12 typically includes an operating system (OS) 12x to manage computer hardware and software resources, and provide common services for various applications 12y. The OS 12x includes one or more drivers and/or APIs that provide an interface to hardware devices thereby enabling the OS 12x and applications to access hardware functions. The OS 12x includes middleware that connects two or more separate applications or connects applications 12y with underlying hardware components beyond those available from the drivers/APIs of the OS 12x. The OS 12x may be a general purpose OS or a platform-specific OS specifically written for and tailored to the user system 12.

Each user system 12 also typically includes one or more user input devices, such as a keyboard, a mouse, a trackball, a touch pad, a touch screen, a pen or stylus or the like, for interacting with a GUI provided by the browser/application container on a display (e.g., a monitor screen, liquid crystal display (LCD), light-emitting diode (LED) display, among other possibilities) of the user system 12 in conjunction with pages, forms, applications and other information provided by the system 16 or other systems or servers. For example, the user interface device can be used to access data and applications hosted by system 16, and to perform searches on stored data, and otherwise allow a user to interact with various GUI pages that may be presented to a user. As discussed above, implementations are suitable for use with the Internet, although other networks can be used instead of or in addition to the Internet, such as an intranet, an extranet, a virtual private network (VPN), a non-TCP/IP based network, any LAN or WAN or the like.

The users of user systems 12 may differ in their respective capacities, and the capacity of a particular user system 12 can be entirely determined by permissions (permission levels) for the current user of such user system. For example, where a salesperson is using a particular user system 12 to interact with the system 16, that user system can have the capacities allotted to the salesperson. However, while an administrator is using that user system 12 to interact with the system 16, that user system can have the capacities allotted to that administrator. Where a hierarchical role model is used, users at one permission level can have access to applications, data, and DB information accessible by a lower permission level user, but may not have access to certain applications, DB information, and data accessible by a user at a higher permission level. Thus, different users generally will have different capabilities with regard to accessing and modifying application and DB information, depending on the users' respective security or permission levels (also referred to as "authorizations").

According to some implementations, each user system 12 and some or all of its components are operator-configurable using applications, such as a browser, including computer code executed using one or more central processing units (CPUs) and/or other like computer processing devices (see e.g., processor system 12B of FIG. 1B). Similarly, the system 16 (and additional instances of an MTS, where more than one is present) and all of its components can be operator-configurable using application(s) including computer code to run using the processor system 17, which may include one or more CPUs/processors. Examples of the processors/CPUs of processor system 17 may include one or multiple Intel Pentium® or Xeon® processors, Advanced Micro Devices (AMD) Zen® Core Architecture processor(s), such as Ryzen® or Epyc® processor(s), Accelerated Processing Units (APUs), MxGPUs, or the like; ARM-based processor(s) licensed from ARM Holdings, Ltd. such as the ARM Cortex-A family of processors and the ThunderX2® provided by Cavium™, Inc.; Centrig™ processor(s) from Qualcomm® Technologies, Inc.; Power Architecture processor(s) provided by the OpenPOWER® Foundation and/or IBM®; GeForce®, Tegra®, Titan X®, Tesla®, Shield®, and/or other like GPUs provided by Nvidia®; a MIPS-based design from MIPS Technologies, Inc. such as MIPS Warrior P-class processors; and/or the like, or the like.

The system 16 includes tangible computer-readable media having non-transitory instructions stored thereon/in that are executable by or used to program a server (e.g., the app servers 100 or other servers discussed herein) or other computing system (or collection of such servers or computing systems) to perform some of the implementation of processes described herein. For example, computer program code 26 can implement instructions for operating and configuring the system 16 to intercommunicate and to process web pages, applications and other data and media content as described herein. In some implementations, the computer code 26 can be downloadable and stored on a hard disk, but the entire program code, or portions thereof, also can be stored in any other volatile or non-volatile memory medium or device as is well known, such as a ROM or RAM, or provided on any media capable of storing program code, such as any type of rotating media including floppy disks, optical discs, digital versatile disks (DVD), compact disks (CD), microdrives, and magneto-optical disks, and magnetic or optical cards, nanosystems (including molecular memory ICs), or any other type of computer-readable medium or device suitable for storing instructions or data. Additionally, the entire program code, or portions thereof, may be transmitted and downloaded from a software source over a transmission medium, for example, over the Internet, or from another server, as is well known, or transmitted over any other existing network connection as is well known (e.g., extranet, VPN, LAN, etc.) using any communication medium and protocols (e.g., TCP/IP, HTTP, HTTPS, Ethernet, etc.) as are well known. It will also be appreciated that computer code for the disclosed implementations can be realized in any programming language that can be executed on a server or other computing system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

FIG. 1B shows example implementations of elements of FIG. 1A and example interconnections between these elements according to some implementations. That is, FIG. 1B also illustrates environment 10, but FIG. 1B shows various elements of the system 16 and various interconnections between such elements are shown with more specificity according to some more specific implementations. Additionally, in FIG. 1B, the user system 12 includes a processor system 12A, a memory system 12B, an input system 12C, an output system 12D, and a communications system 12E. In other implementations, the environment 10 may not have the same elements as those shown by FIG. 1B or may have other elements instead of, or in addition to, those listed.

In FIG. 1B, the network interface 20 and/or processor system 17 is/are implemented as a set of application servers $100_1$-$100_N$. Each application server 100 (also referred to herein as an "app server", an "API server", an "HTTP application server," a "worker node", and/or the like) is configured to communicate with tenant DB 22 and the tenant data 23 therein, as well as system DB 24 and the system data 25 therein, to serve requests received from the user systems 12. The tenant data 23 can be divided into individual tenant storage spaces 112, which can be physically or logically arranged or divided. Within each tenant storage space 112, user storage 114 and application metadata 116 can similarly be allocated for each user. For example, a copy of a user's most recently used (MRU) items can be stored to user storage 114. Similarly, a copy of MRU items for an entire organization that is a tenant can be stored to tenant storage space 112.

The process space 28 includes system process space 102, individual tenant process spaces 104 and a tenant management process space 110. In various embodiments, the process space 28 includes one or more query processors 103, one or more stream processors 105, and one or more firewall processors 106. The stream processor(s) 105 and judgment processor(s) 106 may be implemented as software components (e.g., software engines, software agents, artificial intelligence (AI) agents, modules, objects, or other like logical units), as individual hardware elements, or a combination thereof. In an example software-based implementation, the stream processor(s) 105 and judgment processor(s) 106 may be developed using a suitable programming language, development tools/environments, etc., which are executed by one or more processors of one or more computing systems (see e.g., processor system 17 of FIG. 1A). In this example, program code of the stream processor(s) 105 and judgment processor(s) 106 may be executed by a single processor or by multiple processing devices. In an example hardware-based implementation, the stream processor(s) 105 and judgment processor(s) 106 are implemented by respective hardware elements, such as GPUs (or floating point units within one or more GPUs), hardware accelerators (e.g., FPGAs, ASICs, DSPs, SoCs, etc.) that are configured with appropriate logic blocks, bit stream(s), etc. to perform their respective functions, AI accelerating co-processor(s), tensor processing units (TPUs), and/or the like.

The stream processor(s) 105 are systems and/or applications that send or receive data streams and execute the applications or analytics logic in response to detecting events or triggers from the data streams. The stream processor(s) 105 process data directly as it is produced or received and detect conditions from the data streams within a relatively small time period (e.g., measured in terms of milliseconds to minutes). The stream processor(s) 105 may be implemented using any stream/event processing engines or stream analytics engines such as, for example, Apache® Kafka®, Apache® Storm®, Apache® Flink®, Apache® Apex®, Apache® Spark®, IBM® Spade, Nvidia® CUDA™, Intel® Ct™, Ampa™ provided by Software AG®, StreamC™ from Stream Processors, Inc., and/or the like. According to various embodiments, the stream processor(s) 105 provide a Change Data Capture (CDC) services, wherein the stream processor(s) 105 include a set of design patterns that determine and track data changes in the DB 22, and indicate those changes to an MDM system (e.g., MDM system 304 of FIG. 3). Any of the aforementioned streaming technologies may be used to provide the CDC services, and additional or alternative implementations that may be used include griddable.io provided by salesforce.com®; LinkedIn® Databus, Equalum® real-time streaming or "data beaming", Debezium CDC platform, Oracle® GoldenGate, or the like. As discussed in more detail infra, the changes/updates may be indicated to the MDM service in the form of judgments as generated by the judgment processor(s) 106.

The judgment processor(s) 106 are systems and/or applications that convert data entities (e.g., field values of one or more records) into a logical judgments. These judgments are then streamed or otherwise sent to an MDM system (e.g., MDM system 304 of FIG. 3) to provide MDM services. Additionally, the judgment processor(s) 106 may convert judgments obtained from the MDM system into suitable transactions or query language statements for execution by the query engine(s) 103. As examples, the judgment processor(s) 106 may use a suitable mapping data structure, data transform, translator, etc. to convert data entities into judgments, and convert judgments into transactions. In some embodiments, the judgment processor(s) 106 may control or enforce the order in which transactions are processed, which may be based on an MDM consistent state as discussed in more detail infra. Alternatively, the query engine(s) 103 may be used to enforce the MDM consistent state. These and other aspects are discussed in more detail infra. The judgment processor(s) 106 may be implemented using the same or similar technologies as the stream processor(s) 105 and/or the judgment processor 306 discussed infra with respect to FIG. 3. These and other aspects are discussed in more detail infra with respect to FIGS. 3-5.

The application platform 18 includes an application setup mechanism (ASM) 38 that supports application developers' ("app developers") creation and management of applications. Such applications and others can be saved as metadata into tenant DB 22 by save routines 36 for execution by subscribers as one or more tenant process spaces 104 managed by tenant management process 110, for example. Invocations to such applications can be coded using Procedural Language (PL)/Salesforce® Object Query Language (SOQL) 34, which provides a programming language style interface extension to Application Programming Interface (API) 32. A detailed description of some PL/SOQL language implementations is discussed in commonly assigned U.S. Pat. No. 7,730,478, titled METHOD AND SYSTEM FOR ALLOWING ACCESS TO DEVELOPED APPLICATIONS VIA A MULTI-TENANT ON-DEMAND DATA- BASE SERVICE, by Craig Weissman, issued on Jun. 1, 2010, and hereby incorporated by reference in its entirety and for all purposes. Invocations to applications can be detected by one or more system processes, which manage retrieving application metadata 116 for the subscriber making the invocation and executing the metadata as an application in a virtual machine.

In some implementations, the application platform 18 also includes policies 35. The policies 35 comprise documents and/or data structures that define a set of rules that govern the behavior of the various subsystems of the app server 100. For example, one or more of the policies 35 may dictate how to handle network traffic for specific network addresses (or address ranges), protocols, services, applications, content types, etc., based on an organization's information security (infosec) policies, regulatory and/or auditing policies, access control lists (ACLs), and the like. Additionally, the policies 35 can specify (within various levels of granularity) particular users, and user groups, that are authorized to access particular resources or types of resources, based on the org's hierarchical structure, and security and regulatory requirements. The documents or data structures of the policies 35 may include a "description," which is a collection of software modules, program code, logic blocks, parameters, rules, conditions, etc., that may be used by the app server 100 to control the operation of the app server 100 and/or access to various services. Any suitable programming languages, markup languages, schema languages, etc., may be used to define individual policies 35 and instantiate instances of those policies 35. As examples, the policies 35 may be defined using XML, JSON, markdown, IFTTT ("If This Then That"), PADS markup language (PADS/ML), Nettle, Capirca™, and/or some other suitable data format, such as those discussed herein.

The application platform 18 may be, or may include, a development environment, programming language(s), and/or tools (collectively referred to as a "development environment", "dev-environment" and the like) that allows app developers to create/edit applications for implementing the various embodiments discussed herein. As examples, the dev-environment may be or include a software development environment (SDE), an integrated development environment (IDE), a software development kit (SDK), a software development platform (SDP), a schema builder, a modeling language application, a source code editor, build automation tools, debugger, compiler, interpreter, and/or some other like platform, framework, tools, etc. that may assist an app developer in building applications, configurations, definitions, and/or the like. In some implementations, the dev-environment may be a standalone application, or may be a web-based or cloud-based environment (e.g., a native application, a web application, or a hybrid application including GUIs that render an SDE/IDE/SDK/SDP implemented by a backend service (e.g., DB system 16, a cloud service provider, etc.) in a web browser or application container).

The system 16 of FIG. 1B also includes a user interface (UI) 30 and an API 32 (also referred to as a "web service") to system 16 resident processes, which allow users or developers at user systems 12 to access the resident processes. In some implementations, application (app) code, app/service templates, and/or policies 35 developed by tenants may be pushed or otherwise sent to the system 16 using API 32. In these implementations, the app code, app/service templates, and/or policies 35 may be developed using a development (dev) environment, programming language(s), and/or dev-tools provided by the system 16. The API 32 may be implemented as a remote API or a web API, such as a Representational State Transfer (REST or RESTful) API, Simple Object Access Protocol (SOAP) API, salesforce.com Apex API, and/or some other like API. The API 32 may be implemented as a web service including, for example, Apache® Axi2.4 or Axi3, Apache® CXF, JSON-Remote Procedure Call (RPC), JSON-Web Service Protocol (WSP), Web Services Description Language (WSDL), XML Interface for Network Services (XINS), Web Services Conversation Language (WSCL), Web Services Flow Language (WSFL), RESTful web services, and/or the like.

In some implementations, the API 32 may include one or more public APIs and one or more private APIs. The public APIs are APIs that includes one or more publically exposed endpoints that allows user systems 12 to access tenant data. These endpoints specify where resources are located and/or how particular web services can be accessed. The application 12y may be used to generate and transmit a message (e.g., an HTTP message) with a user-issued query and a suitable URI/URL to access of an endpoint of the system 16. In embodiments, one or more of the public APIs may be an asynchronous ("async") query API, where the user-issued query includes an API call or other like instruction indicating that a user-issued query should be treated as an async query (referred to as an "async query verb"). The async query verbs to invoke the async query API may be defined by API 32 and can be coded using PL/SOQL 34 or some other suitable programming or query language. When an async query invokes the async query API, an async query engine (e.g., query engine 103) or async query scheduler may generate a corresponding async query job. The term "job" as used herein refers to a unit of work or execution that performs work that comprises one or more tasks. Individual jobs may have a corresponding job entity comprising a record or DB object that stores various values, statistics, metadata, etc. during the lifecycle of the job or until the job is executed, which are placed in a schedule or queue and executed from the queue, in turn. An async query job entity corresponding to an async query job is a job entity existing for the during the lifecycle of an async query, which is placed in a schedule or queue and executed by the async query engine, in turn. The async public API may be implemented as a REST or RESTful API, SOAP API, Apex API, and/or some other like API, such as those discussed herein.

Private APIs are APIs 32 that are private or internal to the system 16, which allows system applications (e.g., tenant management process 110, system process 102, query engine 103, stream processor(s) 105, and judgment processor(s) 106 to access other system applications. The private APIs 32 may be similar to the public APIs 32 except that the endpoints of the private APIs 32 are not publically available or accessible. The private APIs 32 may be made less discoverable by restricting users, devices, and/or applications from calling or otherwise using the private APIs 32. For example, use of the private APIs 32 may be restricted to machines inside a private network (or an enterprise network), a range of acceptable IP addresses, applications with IDs included in a whitelist or subscriber list, requests/calls that include a particular digital certificate or other like credentials, and/or the like. The private APIs may be implemented as a REST or RESTful API, SOAP API, Apex API, a proprietary API, and/or some other like API.

Each application server 100 can be communicably coupled with tenant DB 22 and system DB 24, for example, having access to tenant data 23 and system data 25, respectively, via a different network connection 15. For example, one application server $100_1$ can be coupled via the network 14 (e.g., the Internet), another application server $100_{N-1}$ can be coupled via a direct network link 15, and another application server 100$_N$ can be coupled by yet a different network connection 15. Transfer Control Protocol and Internet Protocol (TCP/IP) are examples of typical protocols that can be used for communicating between application servers 100 and the system 16. However, it will be apparent to one skilled in the art that other transport protocols can be used to optimize the system 16 depending on the network interconnections used. The application servers 100 may access the tenant data 23 and/or the system data 25 using suitable private APIs as discussed previously.

In some implementations, each application server 100 is configured to handle requests for any user associated with any organization that is a tenant of the system 16. In this regard, each application server 100 may be configured to perform various DB functions (e.g., indexing, querying, etc.) as well as formatting obtained data (e.g., ELT data, ETL data, etc.) for various user interfaces to be rendered by the user systems 12. Because it can be desirable to be able to add and remove application servers 100 from the server pool at any time and for various reasons, in some implementations there is no server affinity for a user or organization to a specific application server 100. In some such implementations, an interface system implementing a load balancing function (e.g., an F5 Big-IP load balancer) is communicably coupled between the application servers 100 and the user systems 12 to distribute requests to the application servers 100. In one implementation, the load balancer uses a least-connections algorithm to route user requests to the application servers 100 (see e.g., load balancer 228 of FIGS. 2A-2B discussed infra). Other examples of load balancing algorithms, such as round robin and observed-response-time, also can be used. For example, in some instances, three consecutive requests from the same user could hit three different application servers 100, and three requests from different users could hit the same application server 100. In this manner, by way of example, system 16 can be a multi-tenant system in which system 16 handles storage of, and access to, different objects, data and applications across disparate users and organizations.

In one example storage use case, one tenant can be an organization (org) that employs a sales force where each salesperson uses system 16 to manage aspects of their sales. A user can maintain contact data, leads data, customer follow-up data, performance data, goals and progress data, etc., all applicable to that user's personal sales process (e.g., in tenant DB 22). In an example of a MTS arrangement, because all of the data and the applications to access, view, modify, report, transmit, calculate, etc., can be maintained and accessed by a user system 12 having little more than network access, the user can manage his or her sales efforts and cycles from any of many different user systems. For example, when a salesperson is visiting a customer and the customer has Internet access in their lobby, the salesperson can obtain critical updates regarding that customer while waiting for the customer to arrive in the lobby.

While each user's data can be stored separately from other users' data regardless of the employers of each user, some data can be organization-wide data shared or accessible by several users or all of the users for a given organization that is a tenant. Thus, there can be some data structures managed by system 16 that are allocated at the tenant level while other data structures can be managed at the user level. Because an MTS can support multiple tenants including possible competitors, the MTS can have security protocols that keep data, applications, and application use separate. Also, because many tenants may opt for access to an MTS rather than maintain their own system, redundancy, up-time, and backup are additional functions that can be implemented in the MTS. In addition to user-specific data and tenant-specific data, the system 16 also can maintain system level data usable by multiple tenants or other data. Such system level data can include industry reports, news, postings, and the like that are sharable among tenants.

In some implementations, the user systems 12 (which also can be client systems) communicate with the application servers 100 to request and update system-level and tenant-level data from the system 16. Such requests and updates can involve sending one or more queries to tenant DB 22 or system DB 24. The system 16 (e.g., an application server 100 in the system 16) can automatically generate one or more native queries (e.g., SQL statements or SQL queries or the like) designed to access the desired information from a suitable DB. To do so, the system 16 (e.g., an application server 100 in the system 16) may include one or more query engines 103, which is/are a software engine, SDK, object(s), program code and/or software modules, or other like logical unit that takes a description of a search request (e.g., a user query), processes/evaluates the search request, executes the search request, and returns the results back to the calling party. The query engine(s) 103 may be program code that obtains a query from a suitable request message via the network interface 20 that calls a public API, translates or converts the query into a native query (if necessary), evaluates and executes the native query, and returns results of the query back to the issuing party (e.g., a user system 12). To perform these functions, the query engine(s) 103 include a parser, a query optimizer, DB manager, compiler, execution engine, and/or other like components. In some implementations, each of the illustrated DBs may generate query plans to access the requested data from that DB, for example, the system DB 24 can generate query plans to access the requested data from the system DB 24. The term "query plan" generally refers to one or more operations used to access information in a DB system.

The query engine(s) 103 may include any suitable query engine technology or combinations thereof. As examples, the query engine(s) 103 may include direct (e.g., SQL) execution engines (e.g., Presto SQL query engine, MySQL engine, SOQL execution engine, Apache® Phoenix® engine, etc.), a key-value datastore or NoSQL DB engines (e.g., DynamoDB® provided by Amazon.com®, MongoDB query framework provided by MongoDB Apache® Cassandra, Redis™ provided by Redis Labs®, etc.), MapReduce query engines (e.g., Apache® Hive™, Apache® Impala™ Apache® HAWQ™, IBM® Db2 Big SQL®, etc. for Apache® Hadoop® DB systems, etc.), relational DB (or "NewSQL") engines (e.g., InnoDB™ or MySQL Cluster™ developed by Oracle®, MyRocks™ developed by Facebook.com®, FaunaDB provided by Fauna Inc.), PostgreSQL DB engines (e.g., MicroKernel DB Engine and Relational DB Engine provided by Pervasive Software®), graph processing engines (e.g., GraphX of an Apache® Spark® engine, an Apache® Tez engine, Neo4J provided by Neo4j, Inc.™, etc.), pull (iteration pattern) query engines, push (visitor pattern) query engines, transactional DB engines, extensible query execution engines, package query language (PaQL) execution engines, LegoBase query execution engines, and/or some other query engine used to query some other type of DB system (such as any processing engine or execution technology discussed herein). In some implementations, the query engine(s) 103 may include or implement an in-memory caching system and/or an in-memory caching engine (e.g., memcached, Redis, etc.) to store frequently accessed data items in a main memory of the system 16 for later retrieval without additional access to the persistent data store. In various embodiments, the query engine 103 may control or enforce the order in which transactions are processed. In these embodiments, order in which transactions are executed may be based on an MDM consistent state, which as discussed in more detail infra, is used to ensure consistency and synchronization for MDM services provided by an MDM system (e.g., MDM system 304 of FIG. 3). In alternative embodiments, the MDM consistent state may be enforced by the judgment processor(s) 106. These and other aspects are discussed in more detail infra.

Each DB can generally be viewed as a collection of objects, such as a set of logical tables, containing data fitted into predefined or customizable categories. As used herein, a "database object", "data object", or the like may refer to any representation of information in a DB that is in the form of an object or tuple, and may include variables, data structures, functions, methods, classes, DB records, DB fields, DB entities, associations between data and DB entities (also referred to as a "relation"), and the like. A "table" is one representation of a data object, and may be used herein to simplify the conceptual description of objects and custom objects according to some implementations. It should be understood that "table" and "data(base) object" may be used interchangeably herein. Each table generally contains one or more data categories logically arranged as columns or fields in a viewable schema. Each row or element of a table can contain an instance of data for each category defined by the fields. For example, a CRM DB can include a table that describes a customer with fields for basic contact information such as name, address, phone number, fax number, etc. Another table can describe a purchase order, including fields for information such as customer, product, sale price, date, etc. In some MTS implementations, standard entity tables can be provided for use by all tenants. For CRM DB applications, such standard entities can include tables for case, account, contact, lead, and opportunity data objects, each containing pre-defined fields. As used herein, the term "entity" also may be used interchangeably with "object" and "table."

In some MTS implementations, tenants are allowed to create and store custom objects, or may be allowed to customize standard entities or objects, for example by creating custom fields for standard objects, including custom index fields. Commonly assigned U.S. Pat. No. 7,779,039, titled CUSTOM ENTITIES AND FIELDS IN A MULTI-TENANT DATABASE SYSTEM, by Weissman et al., issued on Aug. 17, 2010, and hereby incorporated by reference in its entirety and for all purposes, teaches systems and methods for creating custom objects as well as customizing standard objects in a multi-tenant DB system. In some implementations, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

Referring now to the user system 12 in FIG. 1B, the user system 12 includes a processor system 12A, which can include any suitable combination of one or more processors, such as one or more central processing units (CPUs) including single-core or multi-core processors (such as those discussed herein), graphics processing units (GPUs), reduced instruction set computing (RISC) processors, Acorn RISC Machine (ARM) processors, complex instruction set computing (CISC) processors, digital signal processors (DSP), programmable logic devices (PLDs), field-programmable gate arrays (FPGAs), Application Specific Integrated Circuits (ASICs), System-on-Chips (SoCs) and/or programmable SoCs, microprocessors or controllers, or any other electronic circuitry capable of executing program code and/or software modules to perform arithmetic, logical, and/or input/output operations, or any suitable combination thereof. As examples, the processor system 12A may include Intel® Pentium® or Core™ based processor(s); AMD Zen® Core Architecture processor(s), such as Ryzen® processor(s) or Accelerated Processing Units (APUs), MxGPUs, or the like; A, S, W, and T series processor(s) from Apple® Inc.; Snapdragon™ processor(s) from Qualcomm® Technologies, Inc., Texas Instruments, Inc.® Open Multimedia Applications Platform (OMAP)™ processor(s); MIPS Warrior M-class, Warrior I-class, and Warrior P-class processor(s) provided by MIPS Technologies, Inc.; ARM Cortex-A, Cortex-R, and Cortex-M family of processor(s) as licensed from ARM Holdings, Ltd.; GeForce®, Tegra®, Titan X®, Tesla®, Shield®, and/or other like GPUs provided by Nvidia®; and/or the like.

The memory system 12B can include any suitable combination of one or more memory devices, such as volatile storage devices (e.g., random access memory (RAM), dynamic RAM (DRAM), etc.) and non-volatile memory device (e.g., read only memory (ROM), flash memory, etc.). The memory system 12B may store program code for various applications (e.g., application 12y and/or other applications discussed herein) for carrying out the procedures, processes, methods, etc. of the embodiments discussed herein, as well as an operating system (OS) 12x and one or more DBs or DBOs (not shown).

The OS 12x manages hardware and software resources of the user system 12, and provides common services for the applications via one or more drivers and/or APIs that provide an interface to hardware devices thereby enabling the OS 12x and applications to access hardware functions. The OS 12x or some other code stored in memory system 12B may include middleware that connects two or more separate applications or connects applications with underlying hardware components beyond those available from OS 12x and/or the drivers/APIs. The OS 12x may be a general-purpose operating system or an operating system specifically written for/tailored to the user system 12.

The application(s) 12y is/are a software application designed to run on the user system 12 and is used to access data stored by the DB system 16. The application 12y may be platform-specific, such as when the user system 12 is implemented in a mobile device, such as a smartphone, tablet computer, and the like. The application 12y may be a native application, a web application, or a hybrid application (or variants thereof). The application 12y may be developed using any suitable programming language and/or development tools such as any of those discussed herein. In some implementations, the application 12y may be developed using platform-specific development tools and/or programming languages such as those discussed herein. Suitable implementations for the OS 12x, DBs, and applications 210, as well as the general functionality of the user system 12 are known or commercially available, and are readily implemented by persons having ordinary skill in the art, particularly in light of the disclosure herein.

The input system 12C can include any suitable combination of input devices, such as one or more touchscreen interfaces, keyboards, mice, trackballs, scanners, cameras, or interfaces to networks. The output system 12D can include any suitable combination of output devices, such as one or more display devices, printers, or interfaces to networks. The output system 12D is used to display visual representations and/or GUIs 12v based on various user interactions.

The communications system 12E may include circuitry for communicating with a wireless network or wired network. Communications system 12E may be used to establish a link 15 (also referred to as "channel 15," 'networking layer tunnel 15," and the like) through which the user system 12 may communicate with the DB system 16. Communications system 12E may include one or more processors (e.g., baseband processors, network interface controllers, etc.) that are dedicated to a particular wireless communication protocol (e.g., WiFi and/or IEEE 802.11 protocols), a cellular communication protocol (e.g., Long Term Evolution (LTE) and the like), a wireless personal area network (WPAN) protocol (e.g., IEEE 802.15.4-802.15.5 protocols, Bluetooth or Bluetooth low energy (BLE), etc.), and/or a wired communication protocol (e.g., Ethernet, Fiber Distributed Data Interface (FDDI), Point-to-Point (PPP), etc.). The communications system 12E may also include hardware devices that enable communication with wireless/wired networks and/or other user systems 12 using modulated electromagnetic radiation through a solid or non-solid medium. Such hardware devices may include switches; filters; amplifiers; antenna elements; wires, ports/receptacles/jacks/sockets, and plugs; and the like to facilitate the communications over the air or through a wire by generating or otherwise producing radio waves to transmit data to one or more other devices, and converting received signals into usable information, such as digital data, which may be provided to one or more other components of user system 12. To communicate (e.g., transmit/receive) with the DB system 16, the user system 12 using the communications system 12E may establish link 15 with network interface 20 of the DB system 16.

Figure 2A:
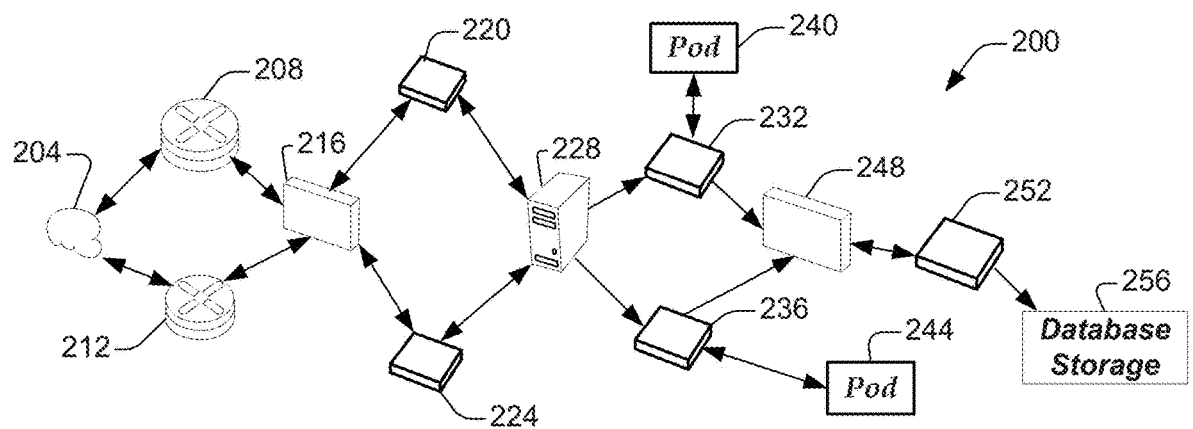
FIG. 2A shows example architecture of an on-demand database service environment according to various embodiments.

FIG. 2A shows a system diagram illustrating example architectural components of an on-demand DB service environment 200 according to some implementations. A client machine communicably connected with the cloud 204, generally referring to one or more networks in combination, as described herein, can communicate with the on-demand DB service environment 200 via one or more edge routers 208 and 212. A client machine can be any of the examples of user systems 12 described above. The edge routers can communicate with one or more core switches 220 and 224 through a firewall 216. The core switches can communicate with a load balancer 228, which can distribute server load over different pods, such as the pods 240 and 244. The pods 240 and 244, which can each include one or more servers or other computing resources, can perform data processing and other operations used to provide on-demand services. Communication with the pods can be conducted via pod switches 232 and 236. Components of the on-demand DB service environment can communicate with DB storage 256 through a DB firewall 248 and a DB switch 252.

Figure 2B:
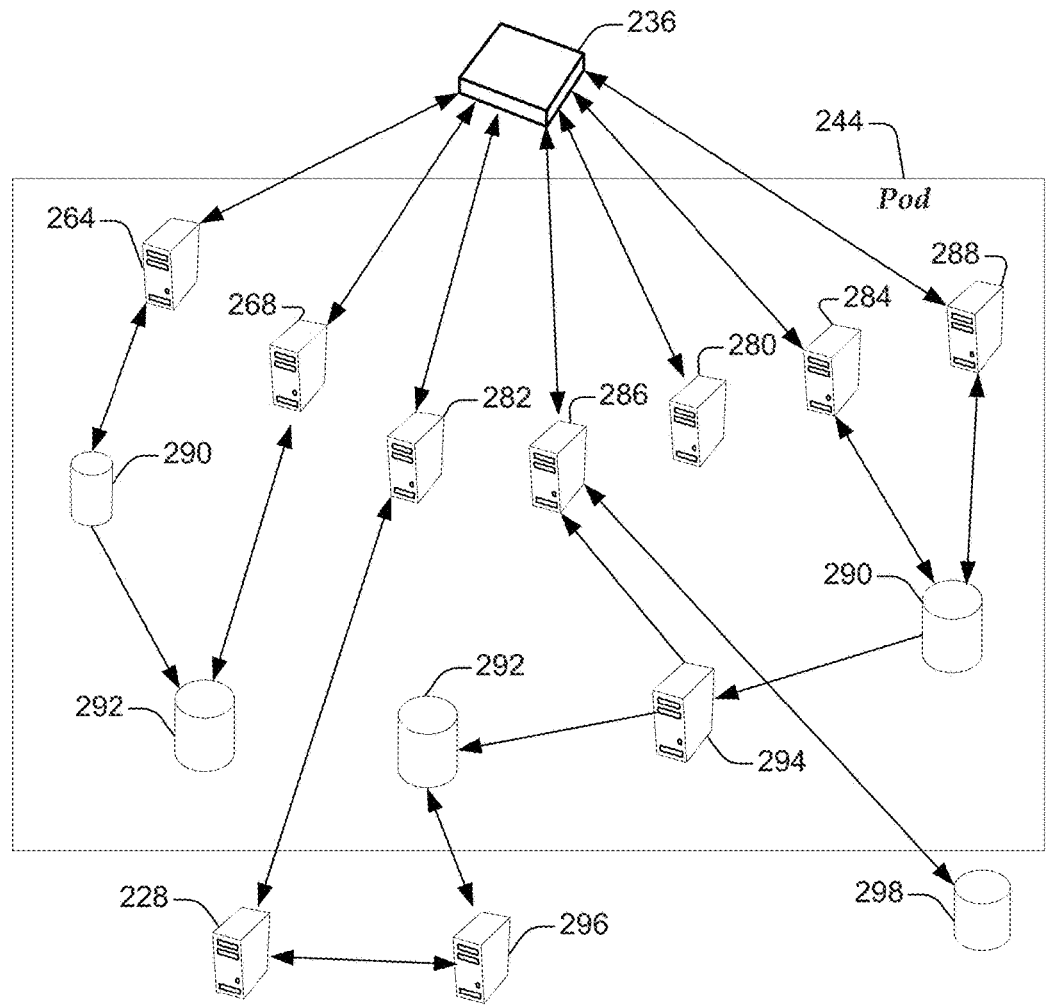
FIG. 2B shows example architectural components of the on-demand database service environment of FIG. 2A according to various embodiments.

As shown in FIGS. 2A and 2B, accessing an on-demand DB service environment can involve communications transmitted among a variety of different hardware or software components. Further, the on-demand DB service environment 200 is a simplified representation of an actual on-demand DB service environment. For example, while only one or two devices of each type are shown in FIGS. 2A and 2B, some implementations of an on-demand DB service environment can include anywhere from one to several devices of each type. Also, the on-demand DB service environment need not include each device shown in FIGS. 2A and 2B, or can include additional devices not shown in FIGS. 2A and 2B. One or more of the devices in the on-demand DB service environment 200 can be implemented on the same physical device or on different hardware. Some devices can be implemented using hardware or a combination of hardware and software. Thus, terms such as "data processing apparatus," "machine," "server" and "device" as used herein are not limited to a single hardware device, rather references to these terms can include any suitable combination of hardware and software configured to provide the described functionality.

The cloud 204 refers to a data network or multiple data networks, often including the Internet. Client machines communicably connected with the cloud 204 can communicate with other components of the on-demand DB service environment 200 to access services provided by the on-demand DB service environment. For example, client machines can access the on-demand DB service environment to retrieve, store, edit, or process information. In some implementations, the edge routers 208 and 212 route packets between the cloud 204 and other components of the on-demand DB service environment 200. For example, the edge routers 208 and 212 can employ the Border Gateway Protocol (BGP). The BGP is the core routing protocol of the Internet. The edge routers 208 and 212 can maintain a table of IP networks or 'prefixes', which designate network reachability among autonomous systems on the Internet.

In some implementations, the firewall 216 can protect the inner components of the on-demand DB service environment 200 from Internet traffic. In some embodiments, firewall 216 may be an active firewall. The firewall 216 can block, permit, or deny access to the inner components of the on-demand DB service environment 200 based upon a set of rules and other criteria (e.g., the policies 35 discussed previously). The firewall 216 can act as, or implement one or more of a packet filter, an application gateway, a stateful filter, a proxy server, virtual private networking (VPN), network access controller (NAC), host-based firewall, unified threat management (UTM) system, a Predictive Intelligence (PI) and/or FaaS, and/or any other type of firewall technology.

In some implementations, the core switches 220 and 224 are high-capacity switches that transfer packets within the on-demand DB service environment 200. The core switches 220 and 224 can be configured as network bridges that quickly route data between different components within the on-demand DB service environment. In some implementations, the use of two or more core switches 220 and 224 can provide redundancy or reduced latency.

In some implementations, the pods 240 and 244 perform the core data processing and service functions provided by the on-demand DB service environment. Each pod can include various types of hardware or software computing resources. An example of the pod architecture is discussed in greater detail with reference to FIG. 2B. In some implementations, communication between the pods 240 and 244 is conducted via the pod switches 232 and 236. The pod switches 232 and 236 can facilitate communication between the pods 240 and 244 and client machines communicably connected with the cloud 204, for example via core switches 220 and 224. Also, the pod switches 232 and 236 may facilitate communication between the pods 240 and 244 and the DB storage 256. In some implementations, the load balancer 228 can distribute workload between the pods 240 and 244. Balancing the on-demand service requests between the pods can assist in improving the use of resources, increasing throughput, reducing response times, or reducing overhead. The load balancer 228 may include multilayer switches to analyze and forward traffic.

In some implementations, access to the DB storage 256 is guarded by a DB firewall 248. In some implementations, the DB firewall 248 is an active firewall. Additionally, the firewall 248 may be equipped with the group optimization technologies discussed herein. The DB firewall 248 can act as a computer application firewall operating at the DB application layer of a protocol stack. The DB firewall 248 can protect the DB storage 256 from application attacks such as structure query language (SQL) injection, DB rootkits, and unauthorized information disclosure. In some implementations, the DB firewall 248 includes a host using one or more forms of reverse proxy services to proxy traffic before passing it to a gateway router. The DB firewall 248 can inspect the contents of DB traffic and block certain content or DB requests. The DB firewall 248 can work on the SQL application level atop the TCP/IP stack, managing applications' connection to the DB or SQL management interfaces as well as intercepting and enforcing packets traveling to or from a DB network or application interface.

In some implementations, communication with the DB storage 256 is conducted via the DB switch 252. The multi-tenant DB storage 256 can include more than one hardware or software components for handling DB queries. Accordingly, the DB switch 252 can direct DB queries transmitted by other components of the on-demand DB service environment (for example, the pods 240 and 244) to the correct components within the DB storage 256. In some implementations, the DB storage 256 is an on-demand DB system shared by many different organizations as described above with reference to FIGS. 1A and 1B.

FIG. 2B shows a system diagram further illustrating example architectural components of an on-demand DB service environment according to some implementations. The pod 244 can be used to render services to a user of the on-demand DB service environment 200. In some implementations, each pod includes a variety of servers or other systems. The pod 244 includes one or more content batch servers 264, content search servers 268, query servers 282, file (force) servers 286, access control system (ACS) servers 280, batch servers 284, and app servers 288. The pod 244 also can include DB instances 290, quick file systems (QFS) 292, and indexers 294. In some implementations, some or all communication between the servers in the pod 244 can be transmitted via the switch 236.

In some implementations, the app servers 288 include a hardware or software framework dedicated to the execution of procedures (e.g., programs, routines, scripts, etc.) for supporting the construction of applications provided by the on-demand DB service environment 200 via the pod 244. In some implementations, the hardware or software framework of an app server 288 is configured to execute operations of the services described herein, including performance of the blocks of various methods or processes described herein. In some alternative implementations, two or more app servers 288 can be included and cooperate to perform such methods, or one or more other servers described herein can be configured to perform the disclosed methods. In various implementations, the app servers 288 may be the same or similar to the app servers 100 discussed with respect to FIGS. 1A-1B.

The content batch servers 264 can handle requests internal to the pod. Some such requests can be long-running or not tied to a particular customer. For example, the content batch servers 264 can handle requests related to log mining, cleanup work, and maintenance tasks. The content search servers 268 can provide query and indexer functions. For example, the functions provided by the content search servers 268 can allow users to search through content stored in the on-demand DB service environment. The file servers 286 can manage requests for information stored in the file storage 298. The file storage 298 can store information such as documents, images, and basic large objects (BLOBs). By managing requests for information using the file force servers 286, the image footprint on the DB can be reduced. The query servers 282 can be used to retrieve information from one or more file systems. For example, the query system 282 can receive requests for information from the app servers 288 and transmit information queries to the NFS 296 located outside the pod.

The pod 244 can share a DB instance 290 configured as a multi-tenant environment in which different organizations share access to the same DB. Additionally, services rendered by the pod 244 may call upon various hardware or software resources. In some implementations, the ACS servers 280 control access to data, hardware resources, or software resources. In some implementations, the batch servers 284 process batch jobs, which are used to run tasks at specified times. For example, the batch servers 284 can transmit instructions to other servers, such as the app servers 288, to trigger the batch jobs.

In some implementations, a QFS 292 is an open source file system available from Sun Microsystems® of Santa Clara, Calif. The QFS can serve as a rapid-access file system for storing and accessing information available within the pod 244. The QFS 292 can support some volume management capabilities, allowing many disks to be grouped together into a file system. File system metadata can be kept on a separate set of disks, which can be useful for streaming applications where long disk seeks cannot be tolerated. Thus, the QFS system can communicate with one or more content search servers 268 or indexers 294 to identify, retrieve, move, or update data stored in the network file systems (NFS) 296 or other storage systems.

In some implementations, one or more query servers 282 communicate with the NFS 296 to retrieve or update information stored outside of the pod 244. The NFS 296 can allow servers located in the pod 244 to access information to access files over a network in a manner similar to how local storage is accessed. In some implementations, queries from the query servers 282 are transmitted to the NFS 296 via the load balancer 228, which can distribute resource requests over various resources available in the on-demand DB service environment. The NFS 296 also can communicate with the QFS 292 to update the information stored on the NFS 296 or to provide information to the QFS 292 for use by servers located within the pod 244.

In some implementations, the pod includes one or more DB instances 290. The DB instance 290 can transmit information to the QFS 292. When information is transmitted to the QFS, it can be available for use by servers within the pod 244 without using an additional DB call. In some implementations, DB information is transmitted to the indexer 294. Indexer 294 can provide an index of information available in the DB 290 or QFS 292. The index information can be provided to file force servers 286 or the QFS 292.

II. Master Data Management (MDM) Embodiments

FIG. 3 illustrates an example master data management (MDM) architecture 300 according to various embodiments. As shown by FIG. 3, the MDM architecture 300 includes an MDM system 304 (also referred to as an "MDM hub 305"

or the like), which integrates, cleans, and/or cross-references master data from a plurality of component data storage systems $310_1$-$310_M$ (where M is a number). The MDM architecture 300 may be used to provide Customer Data Integration (CDI) services to aggregate and manage customer information from preexisting systems 310, and/or provide Product Information Management (PIM) services to collect product/service information from various systems 310 and manage the lifecycle of a finished good or service. In some embodiments, one or more of the component data storage systems $310_1$-$310_M$ (collectively referred to as "component data storage systems 310" or "component DBs 310") may comprise one or more data storage devices and one or more data storage servers. In some embodiments, one or more of the component data storage systems 310 may be datacenters, data farms, or the like. In some embodiments, one or more of the component data storage systems 310 may be the same or similar to the system of environment 10 described previously with respect to FIGS. 1A-1B and/or on-demand DB service environment 200 described previously with respect to FIGS. 2A-2B.

In various embodiments, an MDM system 304 is used to handle MDM services for one or more enterprises or orgs. The MDM services may include, for example, maintaining or ensuring data consistency among component data storage systems 310, and categorizing data as metadata, reference data, master data, transaction data, hierarchical data, historical data, and/or unstructured among many other categories. Metadata is data about other data, which may describe the structure, origin, and/or meaning of the other data. Master data refers to data describing or representing common objects to be shared throughout an enterprise. Reference data is data used to define and distribute collections of common values for master data and/or master data attributes. Reference data can be shared across master or transactional data objects (e.g., countries, currencies, time zones, payment terms, etc.). Transactional data is data about enterprise-related events, and is often related to system transactions, such as sales, deliveries, invoices, trouble tickets, claims, and other monetary and non-monetary interactions that have historical significance or are needed for analysis by other systems. Hierarchical data indicates or describes relationships between various data entities or DBOs, and may be stored as part of an accounting system and/or as descriptions of real world relationships, such as enterprise organizational structures, product lines, and/or services. Historical data comprises transaction data, master data, and/or any other type of data accumulated over time.

To these ends, the MDM system 304 comprises one or more computing systems, which may be communicatively coupled with one or more data storage systems. Each of the computing systems of the MDM system 304 may have processor systems, memory/storage systems, network interfaces and/or communications systems, and/or other like components, which may be the same or similar to the systems/components of the DB system 16 and/or user system 12 discussed previously. In some embodiments, the MDM system 304 may be a single, centralized entity. In other embodiments, the MDM system 304 may be distributed across various computing systems and/or implemented using, or as part of a cloud computing service.

Managing master data may be difficult or burdensome as enterprises and/or orgs grow in size, implement new or updated systems to comply with changing business or regulatory requirements, and/or implement new or updated systems to improve. Master data is the consistent and uniform set of identifiers and extended attributes that describe the core entities of an enterprise or org, and that are used across multiple enterprise processes or systems. For example, master data may be related to or describe individual entities or customers, products, services, or any other subject. Many enterprises and/or orgs have master data scattered across multiple departments and distributed throughout numerous applications, services, DBs, systems, etc. Additionally, master data may be stored in many overlapping component DBs 310 and is often of unknown quality. As an example, an enterprise may purchase or merge with one or more other orgs, each of which have their own master data and data storage systems located in different locations. Each of these data storage systems store various records and some records may pertain to the same subject and/or store the same or similar master data. At the same time, multiple users (e.g., user systems 12) may update or add new data to these records. Without an authoritative source of master data (also referred to as a "single source of truth"), users/applications/services may be unable to access the most accurate and/or up-to-date data, enterprise processes can become more complex to develop and implement, and it becomes difficult to comply with various regulatory requirements (e.g., compliance with the EU General Data Protection Regulation (GDPR), U.S. Foreign Account Tax Compliance Act (FATCA), Dodd Frank Regulations, Home Mortgage Disclosure Act (HMDA), Basel II/III etc.). MDM systems (e.g., MDM system 300) address these issues by systematically integrating, cleansing, and/or cross-referencing master data to create a consistent representation of the subject across the enterprise and to ensure consistent use and reuse of the master data. MDM involves various systems and processes to provide an authoritative source of master data for an enterprise. MDM processes may include, for example, business rule administration, data aggregation, data classification, data collection, data consolidation, data distribution, data enrichment, data governance, data mapping, data matching, and/or data normalization.

The MDM system 304 provides authoritative master data to one or more enterprises. Most MDM systems attempt to create and manage a single version of key master data, where all services/applications that need to read, update, or create master data would be serviced by such MDM systems. When master data can be created, updated, and stored in the MDM system 304 it can be considered a system of record or a "source of truth." Sometimes copies of master data, including partial subsets and/or redundant replicas, need to be created and managed to support performance, availability, and scalability requirements. The MDM system 304 manages, integrates, and synchronizes these copies of the master data. The copies of the master data may be referred to as a system of reference when the replicas of the master data are known to be synchronized with the system of record. A system of reference can still be considered a source of authoritative master data because it is managed and synchronized with the system of record. However, even when synchronized with the system of record, the replicas may not always be completely current. This is because changes to the system of record are often batched together and then applied to the systems of reference on a periodic basis. The system of record (or the system of reference) may be made up of multiple physical subsystems (e.g., servers and/or data storage devices, etc.) deployed at multiple locations, and the physical subsystems may be logically consolidated through federation.

Additionally, the system of reference may not always be completely consistent with the system of record when replicas are used. In general, there are two approaches used to provide consistency including absolute consistency and convergent consistency. A distributed system (e.g., MDM architecture 300) has absolute consistency when information is identical among all replicas at all times that the systems 310 are available. Generally, a two-phase commit transaction protocol is required to achieve absolute consistency. In the two-phase commit transaction protocol involves, all systems 310 that are normally a party to a particular transaction have to be available to perform an update in order for the update to be accepted; if any one of the systems 310 is not available, then none of the systems 310 can be updated. This two-phase commit is not ideal since it can be costly from a performance, complexity, and availability point of view. Additionally, depending on the implementation, absolute consistency is not always technically possible. Convergent consistency involves propagating an update applied to one component DB 310 to the other component DBs 310. The propagation may take place after each update takes place, or multiple updates may be accumulated and the accumulated updates may be processed as a batch. Passing along the updates as they occur can be costly in terms of resource consumption. Processing the updates in a batch-wise fashion is less resource intensive, but may result in delayed propagation.

The MDM architecture 300 may be arranged in a variety of implementations. Typically, most MDM environments are arranged in one of four MDM implementation types, which include a consolidation (or repository) implementation, a registry implementation, a coexistence implementation, and a transactional hub implementation.

The consolidation implementation brings together master data from a variety of existing component systems/DBs 310 into a single managed MDM hub 305. The MDM hub 305 transform, cleans, matches, and integrates the data in order to provide a complete golden record for one or more master data domains. The golden record serves as a system of reference and/or as a trusted source to the component systems/DBs 310 for reporting and analytics. Consolidation MDM systems are not just the single source of truth, but also the single source of data. In this implementation, updates/changes to the data are provided to the MDM hub 305 from the component systems/DBs 310. The MDM hub 305 integrates and cleans the updated data and distributes the integrated and cleaned data to downstream systems (e.g., data warehouses) as read-only data, which is then read and used by the component systems/DBs 310. Consolidation MDM systems tend to be more intrusive than other implementations and do not always contain the most current, up-to-date information.

The registry implementation involves storing master data at existing sources of master data (e.g., one or more of the component systems/DBs 310. In these implementations, the MDM system 304 stores the minimum amount of information required to uniquely identify a master data record, for example, one or more lists of keys that can be used to find all the related records for a particular master data item. The MDM system 304 also provides cross-references (or linkages) to detailed information that is managed within the component systems/DBs 310. The registry MDM system 304 is able to clean and match the identifying information and relies on the source systems/DBs 310 to adequately manage the quality of their own data. The registry MDM system 304 also attempts to synchronize the master data at each component system/DB 310. To resolve queries, the MDM system 304 looks up an identifiers (e.g., indexes) of master data records (e.g., the one or more lists of keys) within the MDM system 304 itself, and retrieves the master data records from the component systems/DBs 310 using the identifiers and cross-reference information. Although registry MDM systems tend to be less obtrusive than repository/consolidation MDM systems, synchronization of multiple disparate DBs can be computationally complex, which may increase computational overhead. Another issue with the registry implementation is that every query against master data is required to be a distributed query (e.g., a distributed join) across all the entries for the desired master data in all the component systems/DBs 310. Distributed queries can be computationally intensive to process depending on the parameters, criteria, filters, etc., included in such queries. Moreover, registry MDM systems 305 usually only manage the quality of the core identifying data its stores, but cannot provide a completely standardized and cleansed view of the master data.

The coexistence MDM implementation involves master data that is authored and stored at the component systems/DBs 310 and an instantiated golden record stored at the MDM system 304 that is synchronized with the master data at the component systems/DBs 310. This allows the coexistence MDM system 304 to manage the quality of the data as it is imported into the MDM system 304. The golden record can be both queried and updated within the MDM system 304. Updates to the master data can be fed back to the component systems/DBs 310 and published to other downstream systems. The coexistence MDM system 304 can interact with other applications and/or users. One advantage of coexistence MDM systems 305 is that it can provide a full set of MDM capabilities without causing significant changes in the existing environment 300. Although a coexistence MDM system 304 can serve as an authoritative source of master data, it does not serve as a system of record because it is not a single place where the master data is authored and updated, which means that it may not always be up-to-date.

The transactional hub implementation style is a centralized, complete set of master data for one or more domains. A transactional hub is an evolution from the consolidation and coexistence implementations, but serves as a system of record rather than as a system of reference. As a system of record, the master data may be directly updated using the services provided by the MDM hub 305. The MDM hub 305 cleans, matches, and augments the master data as update transactions take place, which helps maintain the quality of the master data. After updates are accepted, the MDM hub 305 distributes these changes to the component systems/DBs 310 and/or interested applications or users. Implementing a transactional MDM hub 305 can be complex and costly, and can require alterations to existing systems and applications so that the transactional hub 305 becomes the single point of update within the environment 300.

In the aforementioned implementations, a suitable message technology may be used to execute transactions and provide updates to the master data. Some MDM systems 305 use change data capture (CDC) techniques to capture or otherwise determine updates to the component systems/DBs 310. CDC is the process of capturing changes made at a data source (e.g., the component systems/DBs 310) and applying those throughout an enterprise (e.g., environment 300), which can help ensure data synchronicity. In these implementations, each component system/DB 310 stream change/update events that can be accessed by external entities (e.g., the MDM system 305). In MDM, CDC is used to capture changes occurring in various DBs 310 and then moving that data around as needed.

According to various embodiments, each record in a DB 310 is represented as a claim or judgment about a DB entity, and the MDM system 304 unifies a plurality of claims/judgments from different DBs 310. In these embodiments, linkages are represented as judgments asserting that particular DB entities from different DBs 310 are the same (or similar), and a golden record is represented as the real field values describing each of the particular DB entities. The embodiments herein also provide an unobtrusive mechanism to provide the judgments/claims (e.g., record updates) from the various DBs 310 to the MDM system 304 and provide the relevant judgments/claims back to the DBs 310 from the MDM system 304. In making judgments, the MDM system 304 can determine that multiple records in the same DB 310 describe the same or similar thing ("subject") and should be consolidated into a single record, and performs updates in a manner that does not violate referential integrity in order to avoid losing records. In various embodiments, local transactions at the DBs 310 operate in MDM consistent states to ensure that referential integrity is maintained. New claims/judgments 311 are made when a DB 310 is updated, which are provided to the MDM system 304, updates 313 are provided to the relevant DBs 310, and the updates 313 are applied locally at the relevant DBs 313 through serializable transactions associated with respective MDM consistent states. Such embodiments minimizes the impact on existing applications/services. Additionally, consistency across the DBs 310 can be seen as a way to ensure that distributed transactions see consistent views of data.

The MDM system 304 implemented according to the various embodiments herein provides MDM services that are less intrusive and less computationally complex than existing MDM implementations, such as those discussed previously. For example, the MDM system 304 implementing the embodiments herein disrupts existing transactions on the constituent systems/DBs 310 less often than existing MDM implementations, and can be implemented without altering existing systems/DBs 310 and existing applications/services. Furthermore, the component systems/DBs 310 may be federated into a federated or virtual DB, and the MDM system 304 enables distributed transactions to occur over tables that are mutually consistent with the MDM system 304 once the systems/DBs 310 are federated.

In embodiments, the MDM system 304 attempts to resolve two MDM issues, which include identifying and creating linkages and creating and maintaining golden records. Linkages are links or relationships between data sources (e.g., component systems/DBs 310) that have the same or similar records, or links or relationships between the individual records themselves. As mentioned previously, the golden record is a single version of all the data entities (records) in the master data, and encompasses all the data the system of record. The golden record is used to enforce or ensure consistency among the data stored in the component systems/DBs 310. In various embodiments, the MDM system 304 may use CDC to capture changes that take place at each of the component DBs 310, and to propagate those changes to other DBs 310 as necessary.

In these embodiments, the MDM system 304 enforces an MDM consistent state across all of the component DBs 310 to synchronize the data records at each of the component DBs 310. The MDM consistent state is a state in which all the records in all of the different systems of the environment 300, including the component systems/DBs 310 and/or the MDM system 304 itself, have the latest, most up-to-date information. During operation, each of the entities in environment 300 are in an MDM consistent state until one of the component systems/DBs 310 attempts to add a data entity (record) or update one or more values of one or more existing data entities (corresponding to a distributed sets of records). The attempted data entity change, as captured using the CDC mechanism, triggers operation of an MDM consistent state processor (MCSP) 306. The MCSP 305 may be implemented using the same or similar technologies as the stream processor(s) 104 and/or the query engine(s) 103 discussed previously with respect to FIG. 1B. The MCSP 305 evaluates the attempted changes, updates shared data where necessary, and arrives at another MDM consistent state. Then, the MCSP 305 informs each relevant system/DB 310 which records and/or fields need to be updated to be consistent with the new MDM consistent state. Each of the relevant systems/DBs 310 update their own version of the shared data as instructed by the MDM system 304. In various embodiments, the relevant systems/DBs 310 must complete the necessary transactions to update their local version of the data in order to transition from the previous MDM consistent state to the new MDM consistent state. In some cases, the MCSP 305 may reject the proposed changes, and instruct the system/DB 310 attempting the changes to keep the previous data values (e.g., the data values before requesting the update/change). The eventual output is a set of DBs 310 with consistent and synchronized data values across the identified data entities, each of which internally maintains referential integrity.

For example, if component DB $310_1$ has transactions taking place over some period of time. On a periodic basis, DB $310_1$ receives an update 313 from the MDM system 304 that affects some set of records in DB $310_1$. Assuming that DB $310_1$ is in a first MDM consistent state, processing the update 313 will update the information in DB $310_1$ causing DB $310_1$ to transition from the first MDM consistent state to a second MDM consistent state. In various embodiments, to maintain DB consistency requirements for transactions, processing the update 313 is serializable and/or atomic with respect to all other transactions occurring in the DB $310_1$, such that all other transactions appear as occurring either before or after processing update 313. In other words, every transaction must occur in a corresponding MDM consistent state. From the point of view of DB $310_1$, a transaction that starts before update 313 arrives at DB $310_1$ needs to be completed in the current MDM consistent state, even if update 313 presents more up-to-date information.

The MDM consistent states may be managed using judgments. In the example of FIG. 3, the MDM system 304 maintains a set of judgments 309. Each judgment in the set of judgments 309 indicates a record (row) with a set of fields (columns) in a set of tables T. A judgment is a logical or extralogical assertion about an object. In these embodiments, each judgment of the set of judgments 309 is an assertion about the values in the set of fields for a corresponding record. In various embodiments, the MDM system 3046 includes a judgment processor 306, which takes the set of judgments 309, and combines or consolidates the judgments into a new set of judgments 309 having a set of records (rows) that can justify an assignment of field values.

The inputs 311 to the MDM system 304 indicate a set of records (rows) from a set of tables T from a different component DBs 310. Additionally, there may be external inputs of other master data from other data storage systems 310 (not shown by FIG. 3). In various embodiments, the inputs 311 from the component DBs 310 are also in the form of judgments (also referred to as "judgments 311"). In these embodiments, each of the input judgments 311 are assertions that a locally stored record has certain values in a set of fields. In various embodiments, the input judgments 311 and each of the set of judgments 309 may be singleton judgments, which are judgments with exactly one element, data item, or database object. In some embodiments, each singleton judgment is an assertion about an individual field rather than a set of fields. Aspects of singleton judgments are discussed in more detail infra.

As mentioned previously, the inputs 311 may be captured using a suitable CDC service (see e.g., stream processor(s) 105 discussed previously). In these embodiments, one or more triggers may be used to trigger the systems/DBs 310 to generate and send the judgments 311 to the MDM system 304. In one example, a database trigger or log trigger may be used to log updates/changes to a table t in separate queue(s), where judgments 311 are sent based on the queue order. In another example, the tables T may have a field indicating a timestamp of a last change to a corresponding record, and after performing a table scan or other like operation on the tables T, any record in any table t that has a timestamp that is more recent than the last time data was captured is considered to have changed, and may trigger a judgment 311 to be sent to the MDM system 304. Additionally or alternatively, a version number field, status indicator field, or any combination of timestamp, version number, and status indicator fields may be used in a similar manner as the aforementioned timestamp example. Other CDC techniques may be used in other embodiments.

In response to receipt of (singleton) judgments 311 from the component DBs 310, the judgment processor 306 attempts to improve the set of judgments 309 by consolidating the records (rows) together and updating the field values with the best available values. The best available values may be determined using an MDM data model or one or more policies defined by the enterprise or the MDM service provider. In these embodiments, the data model or policies may include survivorship or arbitration rules that indicate how data values and/or data attributes should be used to select a data value to be used as a master data value, and/or merging rules for identifying related records based on various attributes. These data models and/or policies may be data structures that are the same or similar as the policies 35 and formed in the same or similar manner as the policies 35 discussed previously with respect to FIG. 1B. Additionally or alternatively, various machine learning (ML) models may be used to develop and/or update the policies 35. Additionally or alternatively, the judgment processor 306 improves the set of judgments 309 by determining the provability of a judgment 311 (e.g., the asserted field value(s) of a particular record) with respect to the set of judgments 309 (e.g., the asserted field value(s) of the particular record in the set of judgments 309). The judgment processor 306 may determine the provability of a judgment 311 using suitable mathematical logic such as first-order resolution, superposition, mathematical induction, and/or the like. Additionally, the judgment processor 306 may be a suitable automated theorem prover (ATP), proof assistant, an automated reasoning system, an inference engine, or the like, which may be implemented using a suitable ML model or the like. In these embodiments, the collection of field values in the final/improved set of judgments 309 is a golden record and the consolidated rows are a set of linkages.

As an example, each of the component DBs 310 comprises a set of tables T (including each of tables $t_A$, $t_B$, and $t_C$ in FIG. 3), where each table t in the set of tables T includes a set of records (rows), each record (or row) has a tuple of fields, and one of the fields in the tuple of fields is an index field containing unique values. Across a set of DBs D, every record (row) is uniquely identifiable by the tuple (d in D, t in T, r in t), where r is the unique index of the row/record. Each judgment in the set of judgments 309 is in the form:

$$[(d_n, t, r_i) \ldots (d_m, t, r_j)] \vdash (f_1, \ldots, f_k) \quad \text{[equation 1]}$$

Note that equation 1 is in human-readable form, and in various embodiments, each judgment may have a different machine-readable representation than as shown above. In equation 1, the turnstile symbol ($\vdash$) is a derivable operator or a provable operator (e.g., in proof theory or propositional calculus). Additionally, the tuples $(d_n, t, r_i) \ldots (d_m, t, r_j)$ represent rows in a given table across the set of DBs D, the tuple $(f_1, \ldots, f_k)$ is/are field values chosen by the MDM system 304 (or the judgment processor 307), and i, j, k, m, and n are numbers. In equation 1, the field values $(f_1, \ldots, f_k)$ is/are derivable/provable from the rows $(d_n, t, r_i) \ldots (d_m, t, r_j)$ in the set of DBs D. When each judgment is a singleton judgment, where a single field is considered, the tuple on the left hand side of equation 1 may have a field name and the right hand side of equation 1 may include a single value for the indicated field. In these ways, the set of judgments 309 is a set of singleton judgments where each record (row) in the set of DBs D is a singleton judgment. In some embodiments, each singleton judgment may be in the following human-readable form, where f is a field name and v is a value:

$$[(d, t, r, f)] \vdash (v, \ldots) \quad \text{[equation 2]}$$

In this example, the judgment processor 306 improves the set of judgments 309 by consolidating left hand sides of the judgments in the set of judgments 309 by grouping records (rows) together, and by updating the right hand sides of the judgments in the set of judgments 309 with the best (with respect to master data) values available for whatever algorithm used by the MDM system 304 (or the MCSP 305). The best values for the fields (e.g., the right hand sides of the judgments) may be selected from among the values given by fields of the grouped together records (e.g., the left hand sides of the judgments), and possibly from external master data and or reference data. Additionally, the grouping of records in the set of judgments 309 enables the consolidation of records that refer to the same subject (e.g., a real world object) within individual DBs 310 and across multiple DBs 310. The final (unified) set of judgments 309 is MDM system's 305 best guess at the correct state of the world given all its inputs up to that point in time. In the context of MDM, the collection of records (e.g., the right hand side of equations 1 and/or 2) in the unified set of judgments 309 is a golden record and the field values (e.g., the left hand side of equations 1 and/or 2) in the unified set of judgments 309 is a set of linkages.

The MDM system 304 (or the MCSP 305) communicates messages 313 back to the component DBs 310 whenever the right hand values (e.g., the field values) associated with a record (row) are changed. These values may change because the rows have been consolidated into a new judgment and/or because better master data is available. When these values are changed, the MDM system 304 (or the MCSP 305) instructs the relevant DBs 310 to update the field values. The MDM system 304 (or the MCSP 305) also communicates messages 313 back to the component DBs 310 whenever the records (rows) are consolidated on the left hand side of equations 1 and 2 from the same DB 310. This means that the MDM system 304 (or the judgment processor 306) has determined that those rows are duplicates. In these cases, the MDM system 304 (or the MCSP 305) instructs the relevant DBs 310 to consolidate the relevant records (rows) while conserving referential integrity. In these embodiments, the MCSP 305 transitions the MDM system 304 into a new MDM consistent state in response to detecting a change to the right hand side or the left hand side of one or more judgments in the set of judgments 309. The eventual output is a set of DBs 310 with consistent and synchronized data values across the identified data entities, each of which internally maintains referential integrity.

The messages 313 sent to the component DBs 310 may be, or may include judgments, filtered by the records (rows) on the relevant DB 310; these judgments may be referred to as "update judgments 313" or the like. These messages 313 can be sent to the systems/DBs 310 using a suitable messaging/communication technology, including API calls or any database synchronization technology. These technologies may be the same or similar to those discussed elsewhere herein. The component DBs 310 (e.g., implementing respective judgment processor(s) 106) may then translate the judgments into suitable query language (e.g., SQL, OQL, SOQL, NoSQL, etc.) statements/instructions including, for example, a sequence of update operations, which can be performed in the context of one or more transactions. Consolidations of records at the DBs 310 should be handled carefully to preserve referential integrity, for example, ensuring that all foreign keys at the end of the consolidation point to the consolidated record.

The foregoing is sufficient to support transactions occurring at individual DBs 310, where each local transaction logically occurs or takes place before or after an MDM update 313. This allows the individual DBs 310 to always be in an MDM consistent state. Additionally, by using a CDC mechanism as discussed previously, performing MDM updates 313 with generated transactions are effectively invisible to local processing at the systems/DBs 310.

Furthermore, the MDM consistent states may be used to provide consistency and synchronicity for distributed queries/transactions (e.g., when update judgments 313 and/or updates to individual DBs 310 are based on distributed queries). A distributed query is a query that accesses data entities from tables of different DBs 310. For example, if a distributed query includes an equijoin clause over fields in two tables, the values in two rows might be the same in an MDM consistent state, while in an inconsistent state one of the rows may have an updated value that has not appeared in the other causing the join to fail. An equijoin is a join condition containing an equality operator, which only returns records (rows) that have equivalent values for the specified fields (columns).

In various embodiments, linearly ascending transaction IDs (tIDs) may be used to provide consistency and synchronicity for distributed transactions. The tIDs may be produced after a component DB 310 completes execution/processing of a local transaction that may be a part of a distributed query. In this embodiment, two component DBs 310 are considered to be MDM consistent if they have both processed transactions to obtain the same tID. For example, two tables $t_A$ and $t_B$ from DB 310$_1$ and DB 310$_2$, respectively, are MDM consistent if they both have been processed to the same tID, for example, where $tID(t_A) > tID(t_B)$ and $tID(DB\ 310_2) > tID(DB\ 310_1)$ showing that $tID(t_B)$ was not updated after the last update to DB 310$_1$. In other words, even though the last time that table $t_B$ was updated was later than table $t_A$, and it can be shown that there is no missing update for $t_A$, then the data in table $t_A$ and table $t_B$ are consistent. The same principle is applicable if DB 310$_1$ and DB 310$_2$ are reversed in the aforementioned example. These embodiments allow the DBs 310 to maintain the same kind of referential integrity for distributed transactions that is possible for non-distributed transactions in a single database or table.

In these embodiments, a distributed query will return MDM consistent data if the tables t accessed by the distributed query are MDM consistent among themselves, which can be determined at the time of query execution. In this way, implementing the MDM services does not change the query, the general query plan, or the implementation of the query engine 103. Instead, the MDM services control when the query can be executed by ensuring that the accessed DBs 310 are in an MDM consistent state. Therefore, given a query plan, individual systems/DBs 310 can decide if a query can be executed simultaneously.

Figure 4:
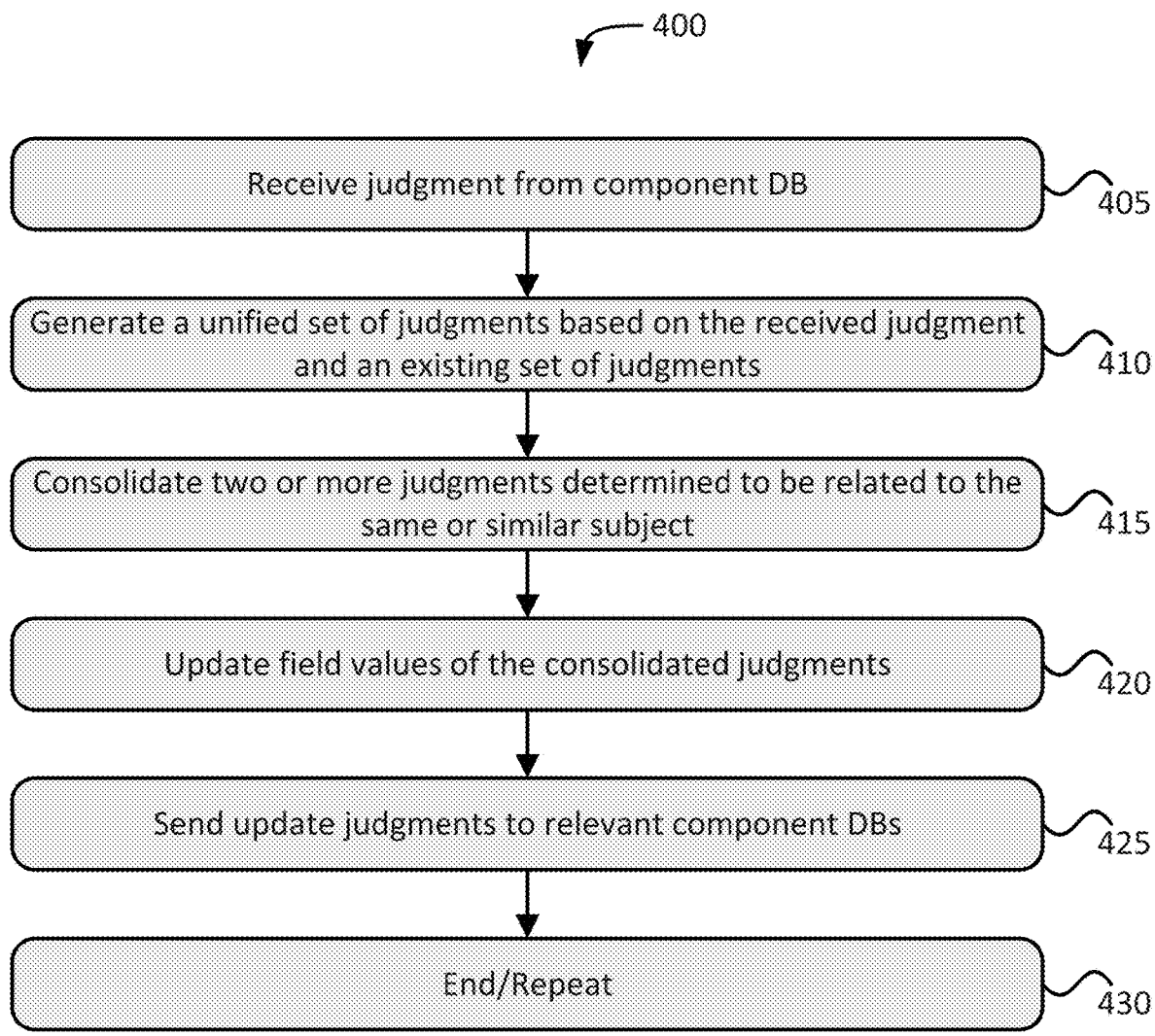
FIG. 4 shows an example MDM process that may be performed by an MDM system according to various embodiments.
Figure 5:
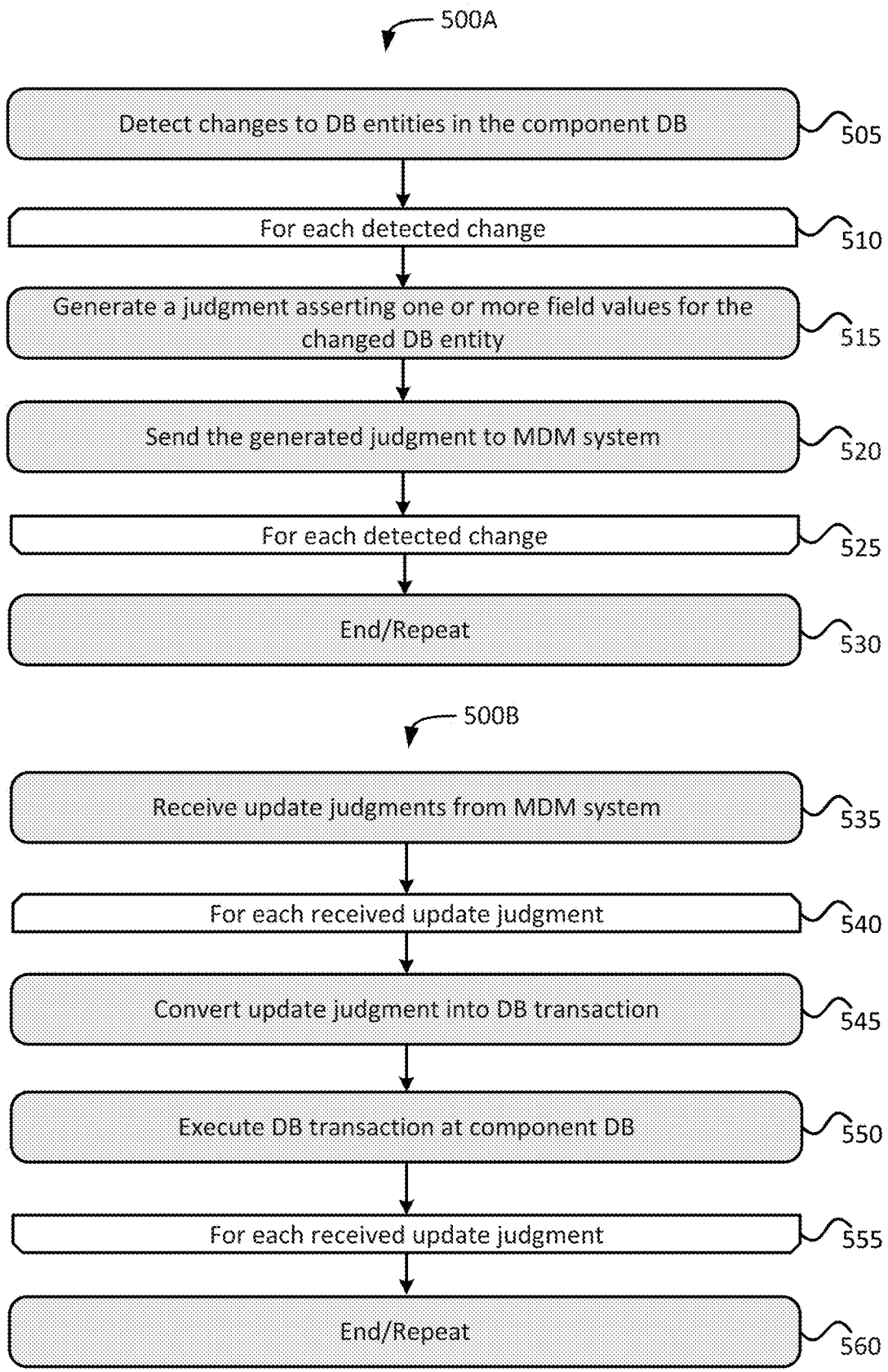
FIG. 5 shows example MDM processes that may be performed by component data storage systems according to various embodiments.

FIGS. 4-5 illustrates processes 400 and 500A-500B, respectively, in accordance with various embodiments. For illustrative purposes, the operations of processes 400 and 500A-500B are described as being performed by elements/components shown and described with regard to FIGS. 1A-3. However, other computing devices may operate the processes 400 and 500A-500B in a multitude of implementations, arrangements, and/or environments. In embodiments, the computer system(s) includes program code stored in a memory system, which when executed by a processor system, is configurable to the computer system(s) to perform the various operations of processes 400 and 500A-500B. While particular examples and orders of operations are illustrated in FIGS. 4-5, in various embodiments, these operations may be re-ordered, separated into additional operations, combined, or omitted altogether.

FIG. 4 shows an example MDM process 400 according to various embodiments. Process 400 may be performed by MDM system 304 of FIG. 3. Process 400 begins at operation 405 where the MDM system 305 receives a judgment 311 from a component DB 310, where the judgment 311 indicates an update to an existing record stored by the component DB 310 or an addition of a new record stored by the component DB 310. At operation 410, the MDM system 304 generates a unified set of judgments using the received judgment and a previously existing set of judgments. Each judgment in the unified set of judgments comprises a record and corresponding field values. In the unified set of judgments, linkages are judgments asserting that particular records from different DBs 310 are related to the same or similar subject, and a golden record comprises field values describing each of the records. At operation 415, the MDM system 304 consolidates, into a single judgment, two or more judgments that are determined as describing the same or similar subject. At operation 420, the MDM system 304 performs updates to field values of the consolidated judgments in a manner that does not violate referential integrity. In embodiments, each update is associated with an MDM consistent state, and performing an update causes the MDM system 304 to transition from a current MDM consistent state to a new MDM consistent state. At operation 425, the MDM system 304 provides update judgments 313 to the relevant component DBs 310. The update judgments 313 instruct the relevant component DBs 310 to execute local transactions based on changes to the unified set of judgments with respect to the previously existing set of judgments. The update judgments 313 are converted by the relevant component DBs 310 into serializable transactions associated with respective MDM consistent states. In some embodiments, the MDM system 304 determines a tID from the consolidation of the judgments or the update performed at operation 430; and generates the individual update judgments 313 such that execution of the local transactions is to cause the relevant component DBs 310 to calculate the tID. At operation 430, process 400 ends or repeats as necessary.

FIG. 5 shows an example MDM processes 500A and 500B according to various embodiments. Processes 500A and 500B may be performed by a data storage system 310 (e.g., a computing system that operates/maintains a component DB 310). Additionally, processes 500A and 500B may be performed concurrently or in parallel. Process 500A begins at operation 505 where the data storage system 310 detects a change to a DB entity of the component DB. At open loop operation 510, the data storage system 310 processes each detected change in turn. At operation 515, the data storage system 310 generates a judgment 311 asserting one or more field values for the changed DB entity. At operation 520, the data storage system 310 sends the generated judgment 311 to the MDM system 304. At close loop operation 525, the data storage system 310 loops back to operation 510 to process a next changed DB entity, if any. Then at operation 530, process 500A ends or repeats as necessary.

Process 500B begins at operation 535 where the data storage system 310 receives update judgments 313 from the MDM system 304. At open loop operation 540, the data storage system 310 processes each received judgment 313 in turn. At operation 545, the data storage system 310 converts the update judgment 313 into one or more DB transactions. At operation 550, the data storage system 310 executes the DB transactions at the component DB. In embodiments, the execution of the DB transaction(s) causes the data storage system 310 to transition from a current MDM consistent state to a new MDM consistent state. In embodiments, the data storage system 310 determines or calculates a tID for the new MDM state based on execution of the DB transaction(s), and commits the DB transaction(s) when the calculated tID is greater than a tID associated with the current MDM state. At close loop operation 555, the data storage system 310 loops back to operation 540 to process a next received update judgment 313, if any. Then at operation 560, process 500B ends or repeats as necessary.

The specific details of the specific aspects of implementations disclosed herein may be combined in any suitable manner without departing from the spirit and scope of the disclosed implementations. However, other implementations may be directed to specific implementations relating to each individual aspect, or specific combinations of these individual aspects. Additionally, while the disclosed examples are often described herein with reference to an implementation in which an on-demand database service environment is implemented in a system having an application server providing a front end for an on-demand database service capable of supporting multiple tenants, the present implementations are not limited to multi-tenant databases or deployment on application servers. Implementations may be practiced using other database architectures, for example, ORACLE®, DB2® by IBM®, and the like without departing from the scope of the implementations claimed.

It should also be understood that some of the disclosed implementations can be embodied in the form of various types of hardware, software, firmware, middleware, or combinations thereof, including in the form of control logic, and using such hardware or software in a modular or integrated manner. Other ways or methods are possible using hardware and a combination of hardware and software. Additionally, any of the software components or functions described in this application can be implemented as software code to be executed by one or more processors using any suitable computer language such as, for example, Python, PyTorch, NumPy, Ruby, Ruby on Rails, Scala, Smalltalk, Java™, C++, C#, "C", Rust, Go (or "Golang"), JavaScript, Server-Side JavaScript (SSJS), PHP, Pearl, Lua, Torch/Lua with Just-In Time compiler (LuaJIT), Accelerated Mobile Pages Script (AMPscript), VBScript, JavaServer Pages (JSP), Active Server Pages (ASP), Node.js, ASP.NET, JAMscript, Hypertext Markup Language (HTML), Extensible Markup Language (XML), wiki markup or Wikitext, Wireless Markup Language (WML), Java Script Object Notion (JSON), Apache® MessagePack™, Cascading Stylesheets (CSS), extensible stylesheet language (XSL), Mustache template language, Handlebars template language, Guide Template Language (GTL), Apache® Thrift, Abstract Syntax Notation One (ASN.1), Google® Protocol Buffers (protobuf), Salesforce® Apex®, Salesforce® Visualforce®, Salesforce® Lightning®, Salesforce® Wave™ Dashboard Designer, Salesforce® Force.com® IDE, Android® Studio™ integrated development environment (IDE), Apple® iOS® software development kit (SDK), and/or any other programming language or development tools including proprietary programming languages and/or development tools. Furthermore, some or all of the software components or functions described herein can utilize a suitable querying language to query and store information in one or more databases or data structures, such as, for example, Structure Query Language (SQL), object query language (OQL), Salesforce® OQL (SOQL), Salesforce® object search language (SOSL), Salesforce® analytics query language (SAQL), and/or other query languages. The software code can be stored as a computer- or processor-executable instructions or commands on a physical non-transitory computer-readable medium. Examples of suitable media include random access memory (RAM), read only memory (ROM), magnetic media such as a hard-drive or a floppy disk, or an optical medium such as a compact disk (CD) or DVD (digital versatile disk), flash memory, and the like, or any combination of such storage or transmission devices.

Computer-readable media encoded with the software/program code may be packaged with a compatible device or provided separately from other devices (e.g., via Internet download). Any such computer-readable medium may reside on or within a single computing device or an entire computer system, and may be among other computer-readable media within a system or network. A computer system, or other computing device, includes a monitor, printer, or other suitable display for providing any of the results mentioned herein to a user.

While some implementations have been described herein, it should be understood that they have been presented by way of example only, and not limitation. Thus, the breadth and scope of the present application should not be limited by any of the implementations described herein, but should be defined only in accordance with the following and later-submitted claims and their equivalents.

The invention claimed is:

1. One or more non-transitory computer-readable media (NTCRM) comprising instructions to provide a master data management (MDM) service for a plurality of database (DB) records across multiple component data storage systems (CDSSs), each CDSS of the multiple CDSSs comprises one or more data storage devices and one or more data storage servers, wherein execution of the instructions is to cause an MDM system to:
receive a message including an assertion from a CDSS of the multiple CDSSs, wherein the assertion is a data structure that is a claim about field values in a set of DB fields corresponding to at least one DB record stored by the CDSS, wherein the field values can be derived from the assertion;

generate a unified set of judgments using the received assertion and epistemological assertions making up a previously existing set of judgments about correct values for each of the DB fields, wherein each judgment in the unified set of judgments is a logical or extralogical epistemological assertion about one or more field values of a corresponding record;

transition from a first MDM state to a second MDM state in response to the generation of the unified set of judgments, the second MDM state to enforce an order in which DB transactions are processed by individual CDSSs of the multiple CDSSs in order for the individual CDSSs to transition from the first MDM state to the second MDM state;

generate update judgment messages based on the unified set of judgments, the update judgment messages to instruct one or more data storage servers of respective CDSSs of the multiple CDSSs convert the update judgments into serializable local DB transactions and to execute the serializable local DB transactions on their respective data storage devices to reflect the unified set of judgments, and the execution of the serializable local DB transactions is to cause the respective CDSSs to transition from the first MDM state to the second MDM state, wherein the generation of the update judgments is in response to consolidation of at least two records, and the update judgments are to instruct the respective CDSSs to execute the local DB transactions on their respective data storage devices to consolidate local versions of the at least two DB records in a manner that is consistent with the second MDM state; and send the update judgment messages to the multiple CDSSs to synchronize the CDSSs according to the second MDM state.

2. The one or more NTCRM of claim 1, wherein each judgment in the unified set of judgments are respective singleton judgments, and the update judgments in the update judgment messages are singleton judgments.

3. The one or more NTCRM of claim 1, wherein the unified set of judgments is a golden record including a plurality of records and linkages, the plurality of records in the golden record indicating field values stored by the plurality of DB records across the multiple CDSSs, and the linkages in the golden record comprise respective assertions that at least two DB records of the plurality of DB records have same field values or have field values related to a same subject.

4. The one or more NTCRM of claim 3, wherein the golden record is a single data structure indicating field values stored by the plurality of DB records across the multiple CDSSs.

5. The one or more NTCRM of claim 4, wherein the consolidation is in response to detection of changes to one or more DB records of the plurality of DB records stored across the multiple CDSSs.

6. The one or more NTCRM of claim 3, wherein, to generate the unified set of judgments, execution of the instructions is configurable to cause the MDM system to:

consolidate records of the plurality of records in the golden record indicated by the linkages such that the consolidated records store same field values in a same format.

7. The one or more NTCRM of claim 6, wherein the transition from the first MDM state to the second MDM state is in response to the consolidation.

8. The one or more NTCRM of claim 1, wherein the received message including the judgment from the CDSS is a change data capture (CDC) message.

9. The one or more NTCRM of claim 1, wherein execution of the instructions is configurable to cause the MDM system to:

determine a transaction identifier (tID) from the consolidation of the at least two DB records; and generate the individual update judgments such that execution of the local DB transactions is configurable to cause the respective CDSSs to calculate the tID.

10. A computing system comprising:

a network interface to communicatively couple the computing system with a data storage device, the data storage device storing a component database (DB) among a plurality of component DBs, the component DB comprising a plurality of records; and a processor system coupled with the network interface, the processor system is, in response to each detected change to individual ones of the plurality of records, to:

generate, in response to detecting a change to at least one record in the component DB, an assertion about field values in a set of DB fields corresponding to at least one DB record stored by the component DB, wherein the field values can be derived from the assertion, convert an update judgment from a Master Data Management (MDM) system into a set of serializable local DB transactions to reflect a unified set of judgments at the MDM system, wherein the update judgment is based at least in part on the generated assertion and epistemological assertions making up a previously existing set of judgments about correct values for each of the DB fields, and the update judgment is related to consolidation of at least two DB records, and the conversion comprises derivation of updated field values for respective fields of one or more records of the plurality of records to be updated, execute the set of serializable local DB transactions to update the one or more records using the updated field values and including consolidation of local versions of the at least two DB records in a manner that is consistent with a second MDM state, and transition from a first MDM state to the second MDM state in response to execution of the at least one DB transaction; and wherein the network interface is further to:

send a first message including the generated judgment to the MDM system, receive a second message including the update judgment from the MDM system, and send commands to the component DB to update the component DB according to the executed set of serializable local DB transactions.

11. The computing system of claim 10, wherein the generated judgment is a singleton judgment, and the update judgment is a singleton judgment.

12. The computing system of claim 10, wherein the conversion comprises consolidation of two or more locally stored records of the plurality of records.

13. The computing system of claim 10, wherein the second MDM state is serializable with respect to all other DB transactions to be executed.

14. The computing system of claim 10, wherein the processor system is to:
- determine a transaction identifier (tID) based on execution of the DB transaction; and
- commit the DB transaction when the tID is greater than another tID associated with the first MDM state.

15. A computing system to provide a master data management (MDM) service for a plurality of records stored across a plurality of component database (DBs), the computing system comprising:
- a processor system operable to:
  - generate an improved instance of a set of judgments based on individual assertions obtained from respective component DBs of the plurality of DBs and a current instance of the set of judgments that are epistemological assertions making up a previously existing set of judgments about correct values for DB fields in the respective component DBs, wherein each judgment in the set of judgments is a logical or extralogical epistemological assertion about one or more field values of a corresponding record stored locally at the plurality of component DBs,
  - transition from a first MDM state to a second MDM state in response to the generation of the improved instance of the set of judgments, the second MDM state to enforce an order in which DB transactions are processed by the respective component DBs in order for the respective component DBs to transition from the first MDM state to the second MDM state;
  - generate update judgments based on the improved instance of the set of judgments, the update judgments for instructing the respective component DBs to convert the update judgments into a set of serializable local DB transactions and execute the set of serializable local DB transactions to reflect the improved instance of the set of judgments such that the execution of the set of serializable local DB transactions causes the respective component DBs to transition from the first MDM state to the second MDM state,
  - wherein the generation of the update judgments is in response to consolidation of at least two judgments in the current instance of the set of judgments, and the update judgments are to instruct the respective component DBs to execute the local DB transactions on their respective data storage devices to consolidate local versions of two or more records in a manner that is consistent with the second MDM state; and
- a network interface communicatively coupled with the processor system, the network interface operable to:
  - receive the individual assertions from the respective component DBs, and
  - send individual update judgments to the respective component DBs, the update judgments to cause the respective component DBs to execute the local DB transactions.

16. The computing system of claim 15, wherein records in the set of judgments is a golden record, the golden record being an individual data structure indicating most up-to-date field values stored by the plurality of records across the plurality component DBs, and field values in the set of judgments include a set of linkages between records in the set of judgments related to a same subject.

17. The computing system of claim 16, wherein generation of the improved instance of the set of judgments includes consolidation of judgments in the current instance of the set of judgments.

18. The computing system of claim 17, wherein, to consolidate the judgments, the processor system is operable to:
- group records of the current instance of the set of judgments; and
- update field values of the grouped records with the most-up-to date field values for each of the grouped records.

19. The computing system of claim 17, wherein the processor system is operable to:
- transition from the first MDM state to the second MDM state in response to the consolidation.

20. The computing system of claim 17, wherein the processor system is further operable to:
- generate the update judgments in response to the consolidation.

* * * * *